(12) United States Patent
Kita et al.

(10) Patent No.: US 9,865,199 B2
(45) Date of Patent: Jan. 9, 2018

(54) BACKLIGHT DRIVE CIRCUIT

(71) Applicant: Funai Electric Co., Ltd., Daito-shi, Osaka (JP)

(72) Inventors: Tatsuya Kita, Daito (JP); Kazuhiro Ishibashi, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 247 days.

(21) Appl. No.: 14/203,828

(22) Filed: Mar. 11, 2014

(65) Prior Publication Data

US 2014/0292634 A1 Oct. 2, 2014

(30) Foreign Application Priority Data

Mar. 26, 2013 (JP) ................................ 2013-065123

(51) Int. Cl.
| | |
|---|---|
| *G09G 3/36* | (2006.01) |
| *G09G 3/34* | (2006.01) |
| *H04N 1/00* | (2006.01) |
| *H04N 21/488* | (2011.01) |

(52) U.S. Cl.
CPC ......... *G09G 3/342* (2013.01); *H04N 1/00458* (2013.01); *H04N 21/4886* (2013.01); *G09G 2310/024* (2013.01); *G09G 2310/0237* (2013.01); *G09G 2320/0247* (2013.01); *G09G 2320/0261* (2013.01)

(58) Field of Classification Search
CPC .. G09G 3/3406; G09G 3/3442; G09G 3/3426; G09G 2320/0613; G09G 2320/062; G09G 2320/0626; G09G 2320/0633; G09G 2320/064; G09G 2320/0646; G09G 2320/0653
See application file for complete search history.

(56) References Cited

U.S. PATENT DOCUMENTS

| | | | |
|---|---|---|---|
| 7,292,300 B2 | 11/2007 | Kubo et al. | |
| 2004/0104905 A1* | 6/2004 | Chung | G09G 5/006 345/204 |
| 2008/0180385 A1* | 7/2008 | Yoshida | G09G 3/20 345/102 |
| 2009/0167729 A1* | 7/2009 | Hino | G06F 1/1616 345/204 |

(Continued)

FOREIGN PATENT DOCUMENTS

| | | |
|---|---|---|
| JP | 2002-359098 A | 12/2002 |
| JP | 2011-085693 A | 4/2011 |

(Continued)

*Primary Examiner* — William Boddie
*Assistant Examiner* — Jeffrey A Parker
(74) *Attorney, Agent, or Firm* — Keating & Bennett, LLP

(57) ABSTRACT

A backlight drive circuit supplies drive current to a plurality of backlights, each of the backlights is extinguished before a signal voltage is written to a liquid crystal pixel group of a line corresponding to the backlight, each drive current in the lit period of each of the backlights is a first current when the adjustment value is a first adjustment value and a second current whose current value is higher than the first current when the adjustment value is a second adjustment value that is lower than the first adjustment value, and the lighting duty ratio to obtain a given luminance using the second current is smaller than the lighting duty ratio to obtain the luminance using the first current.

18 Claims, 24 Drawing Sheets

(56) References Cited

U.S. PATENT DOCUMENTS

| | | | |
|---|---|---|---|
| 2012/0025716 A1 | 2/2012 | Nakanishi et al. | |
| 2012/0147062 A1* | 6/2012 | Seo | G09G 3/342 345/690 |
| 2014/0139123 A1* | 5/2014 | Li | H05B 33/0815 315/172 |
| 2014/0210697 A1* | 7/2014 | Hussain | G09G 5/10 345/84 |

FOREIGN PATENT DOCUMENTS

| | | |
|---|---|---|
| JP | 2011-232535 A | 11/2011 |
| WO | 2011/039997 A1 | 4/2011 |

* cited by examiner

Fig. 9

| Adjustment value | | 0 | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|---|---|
| Duty (%) | A | 25.9 | 29.9 | 33.7 | 37.2 | 40.8 | 44.4 | 48.4 | 52.1 | 55.7 | 59.3 | 63.0 | 67.0 | 70.6 | 74.2 | 77.9 | 81.5 | 85.1 | 89.1 | 92.7 | 96.4 | 100 |
|  | B | 14.0 | 16.1 | 18.1 | 20.0 | 22.0 | 23.9 | 26.1 | 28.0 | 30.0 | 31.9 | 33.9 | 67.0 | 70.6 | 74.2 | 77.9 | 81.5 | 85.1 | 89.1 | 92.7 | 96.4 | 100 |
| Drive current (mA) | A | 350 | 350 | 350 | 350 | 350 | 350 | 350 | 350 | 350 | 350 | 350 | 350 | 350 | 350 | 350 | 350 | 350 | 350 | 350 | 350 | 350 |
|  | B | 650 | 650 | 650 | 650 | 650 | 650 | 650 | 650 | 650 | 650 | 650 | 350 | 350 | 350 | 350 | 350 | 350 | 350 | 350 | 350 | 350 |
| Luminance (cd/m2) | A | 65.1 | 75.1 | 84.5 | 93.3 | 102 | 112 | 122 | 131 | 140 | 149 | 158 | 168 | 177 | 186 | 195 | 205 | 214 | 224 | 233 | 242 | 251 |
|  | B | 65.1 | 75.1 | 84.5 | 93.3 | 102 | 112 | 122 | 131 | 140 | 149 | 158 | 168 | 177 | 186 | 195 | 205 | 214 | 224 | 233 | 242 | 251 |

A = Comparative Example 2
B = Embodiment 1

Fig. 17

| Adjustment value | | 0 | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|---|---|
| Duty (%) | A | 25.9 | 29.9 | 33.7 | 37.2 | 40.8 | 44.4 | 48.4 | 52.1 | 55.7 | 59.3 | 63.0 | 67.0 | 70.6 | 74.2 | 77.9 | 81.5 | 85.1 | 89.1 | 92.7 | 96.4 | 100 |
|  | B | 9.8 | 11.7 | 13.5 | 15.5 | 17.5 | 20.0 | 22.5 | 25.0 | 28.0 | 31.0 | 34.5 | 38.5 | 42.0 | 46.5 | 51.0 | 57.0 | 63.0 | 70.0 | 77.5 | 86.5 | 100 |
| Drive current (mA) | A | 350 | 350 | 350 | 350 | 350 | 350 | 350 | 350 | 350 | 350 | 350 | 350 | 350 | 350 | 350 | 350 | 350 | 350 | 350 | 350 | 350 |
|  | B | 923 | 893 | 866 | 838 | 812 | 781 | 753 | 726 | 697 | 670 | 641 | 611 | 586 | 558 | 532 | 501 | 474 | 445 | 418 | 390 | 354 |
| Luminance (cd/m2) | A | 65.1 | 75.1 | 84.5 | 93.3 | 102 | 112 | 122 | 131 | 140 | 149 | 158 | 168 | 177 | 186 | 195 | 205 | 214 | 224 | 233 | 242 | 251 |
|  | B | 64.9 | 75.0 | 83.9 | 93.2 | 101 | 113 | 122 | 131 | 140 | 149 | 159 | 169 | 176 | 186 | 194 | 205 | 214 | 224 | 233 | 242 | 254 |

A= Comparative Example 2
B= Embodiment 2

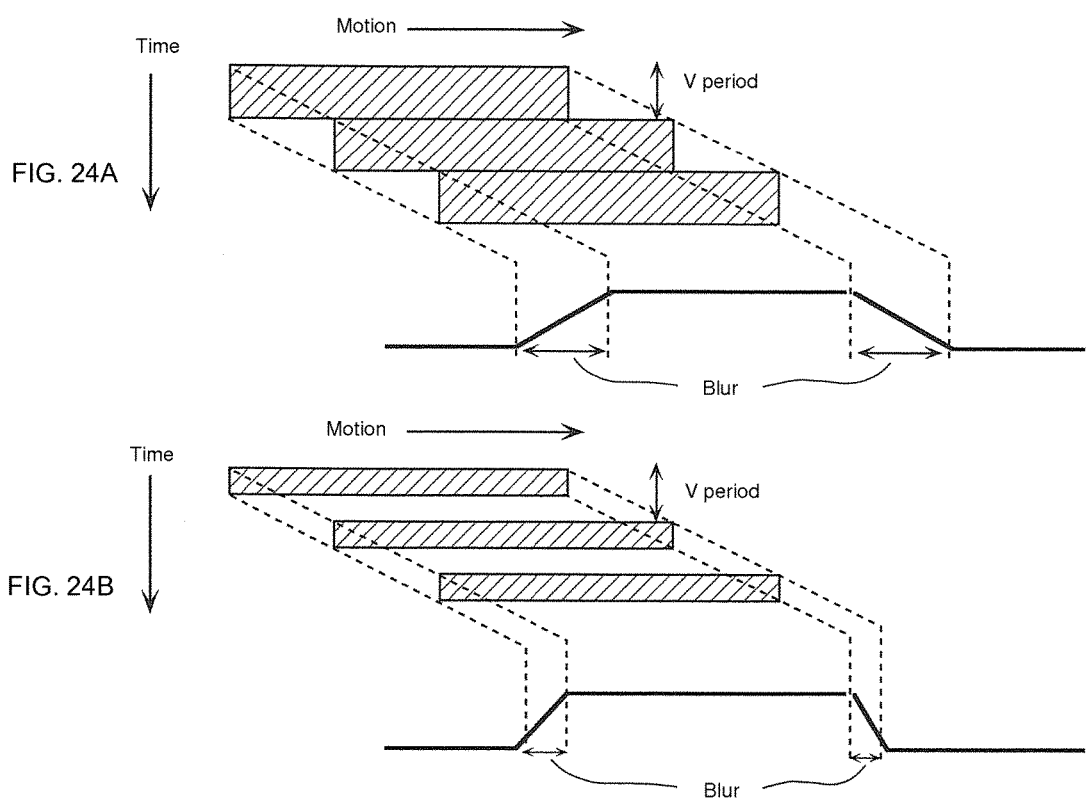

BACKLIGHT DRIVE CIRCUIT

BACKGROUND OF THE INVENTION

1. Field of the Invention

The present invention relates to a backlight drive circuit connected to a liquid crystal panel including groups of liquid crystal pixels disposed in a matrix and a plurality of backlights respectively provided so as to correspond to the plurality of lines of the liquid crystal pixel groups.

2. Description of the Related Art

Liquid crystal display devices such as liquid crystal televisions have been getting bigger. However, the problem is that as they grow larger, blurring of images when moving pictures are displayed (hereinafter may also be referred to as "motion blur") becomes more conspicuous.

Backlight scanning is a known method in liquid crystal display devices to suppress this motion blur. Backlight scanning refers to lighting and extinguishing a plurality of backlights installed for groups of liquid crystal pixels in a display panel in sequence in the line direction.

Such backlight scanning methods include methods of suppressing motion blur by reducing the lighting duty ratio, which is the proportion of the lit period within the backlight flashing cycle, when screen images are moving quickly, while maintaining the lighting duty ratio and suppressing peak current when screen images are moving slowly, thus suppressing power consumption (for example, see Japanese Patent Application Laid-Open Publication No. 2011-232535).

These methods can serve the dual function of suppressing motion blur and cutting power consumption.

With such a backlight scan system, the lighting duty ratio must be raised when increasing the screen image luminance, i.e., when increasing the backlight luminance.

However, in the method disclosed in the Japanese Patent Application Laid-Open Publication No. 2011-232535, the lighting duty ratio is decreased when screen images are moving quickly, so screen image luminance cannot be increased. In other words, the issue is that when screen images are bright, motion blur cannot be suppressed.

SUMMARY OF THE INVENTION

Preferred embodiments of the present invention provide a backlight drive circuit that significantly reduces motion blur even when screen image luminance is high.

A backlight drive circuit according to a preferred embodiment of the present invention is a backlight drive circuit which supplies drive current to a plurality of backlights that are arranged to correspond to a plurality of lines of liquid crystal pixel groups disposed in a matrix, wherein the backlight drive circuit supplies the drive current such that the higher an adjustment value, which indicates a luminance of the backlights, the larger the lighting duty ratio, which is a proportion of the lit period within the flashing cycle of each backlight, the liquid crystal pixel groups transmit, at a transmittance in accordance with the signal voltage written in each liquid crystal pixel, the light from the backlight corresponding to the liquid crystal pixel, the backlight drive circuit extinguishes each backlight before the signal voltage is written to the liquid crystal pixel group of the line corresponding to this backlight, each drive current in the lit period is a first current when the adjustment value is a first adjustment value and a second current whose current value is higher than the first current when the adjustment value is a second adjustment value that is lower than the first adjustment value, and the lighting duty ratio to obtain a given luminance using the second current is smaller than the lighting duty ratio to obtain the luminance using the first current.

Thus, when the adjustment value is the second adjustment value, the lighting duty ratio becomes even smaller. Therefore, motion blur is significantly reduced even when screen image luminance is high. Furthermore, double-imaging is also significantly reduced or prevented by extinguishing the corresponding backlight before writing the signal voltage.

For example, the backlight drive circuit preferably includes a timing instruction unit which orders the lighting and extinguishing timing of each backlight such that the higher the adjustment value, the longer the lit period, a voltage generating unit which generates a first voltage when the adjustment value is above a threshold value and generates a second voltage that is higher than the first voltage when the adjustment value is at or below the threshold value, and backlight drivers which are arranged to correspond to the respective backlights and supply the drive current to the corresponding backlights, and each of the backlight drivers convert the first voltage generated by the voltage generating unit into the first current, convert the second voltage into the second current, and supply the converted currents as the drive current during a period during which the corresponding backlight is ordered to be lit by the timing instruction unit.

As a result, current is switched between two levels with a simple constitution.

Moreover, the timing instruction unit preferably generates a voltage switching signal that indicates whether or not the adjustment value is higher than the threshold value, and the voltage generating unit preferably generates the first voltage when the voltage switching signal generated by the timing instruction unit indicates that the adjustment value is higher than the threshold value and preferably generates the second voltage when the signal indicates that the adjustment value is at or below the threshold value.

In addition, the current value of each of the drive currents during the lit period may be higher as the adjustment value is lower.

As a result, flicker is controlled.

Furthermore, the backlight drive circuit preferably includes a timing instruction unit which orders the lighting and extinguishing timing of each backlight such that the higher the adjustment value, the longer the lit period, a voltage generating unit which generates a voltage that is higher the lower the adjustment value is, and backlight drivers which are arranged to correspond to the respective backlights and supply the drive current to the corresponding backlights, and each of the backlight drivers preferably convert the voltage generated by the voltage generating unit into a current and supply the converted current as the drive current during a period during which the corresponding backlight is ordered to be lit by the timing instruction unit.

Consequently, current is steplessly adjusted with a simple constitution.

Moreover, the timing instruction unit preferably generates a pulse width modulation (PWM) signal which has a duty ratio that is smaller as the adjustment value is lower, and the voltage generating unit preferably includes a digital/analog (D/A) converter which generates an analog voltage that is lower the smaller the duty of the PWM signal is by D/A converting the duty ratio of the PWM signal and an inverter circuit which generates a voltage that is higher the smaller the duty of the PWM signal is by inverting the voltage level of the analog voltage generated by the D/A converter.

In addition, the D/A converter may be an integrator including resistors and capacitors, and the inverter circuit preferably includes a transistor which is configured such that an analog voltage generated by the D/A converter is applied to its control terminal and one of the two output terminals is grounded.

Furthermore, the plurality of adjustment values may also be specified by a user operation.

Moreover, the backlight drive circuit according to another preferred embodiment of the present invention is a backlight drive circuit which supplies drive current to a plurality of backlights that correspond to a plurality of lines of liquid crystal pixel groups disposed in a matrix, wherein the backlight drive circuit supplies the drive current such that the higher an adjustment value, which indicates a luminance of the backlights, the larger a lighting duty ratio, which is a proportion of the lit period within a flashing cycle of each backlight, each drive current in the lit period is a first current when the adjustment value is a first adjustment value and a second current whose current value is higher than the first current when the adjustment value is a second adjustment value that is lower than the first adjustment value, and the lighting duty ratio to obtain a given luminance using the second current is smaller than the lighting duty ratio to obtain the luminance using the first current.

With various preferred embodiments of the present invention, it is possible to realize a backlight drive circuit that significantly reduces or prevents motion blur even when screen image luminance is high.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 9 is a table presenting the lighting duty ratios, drive currents, and light emission luminance of the backlight panel when the adjustment value is changed.

FIG. 17 is a table presenting the lighting duty ratios, drive currents, and light emission luminance of the backlight panel when the adjustment value is changed.

FIGS. 24A and 24B are diagrams that illustrate motion blur, wherein FIG. 24A is a diagram indicating a case of a large lighting duty ratio, and FIG. 24B is a diagram indicating a case of a small lighting duty ratio.

DETAILED DESCRIPTION OF PREFERRED EMBODIMENTS

First, before describing preferred embodiments of the present invention, the principle of double-imaging and motion blur that occur when moving pictures are displayed in a liquid crystal display device will be described using comparative examples.

Comparative Example 1

Figure 21:
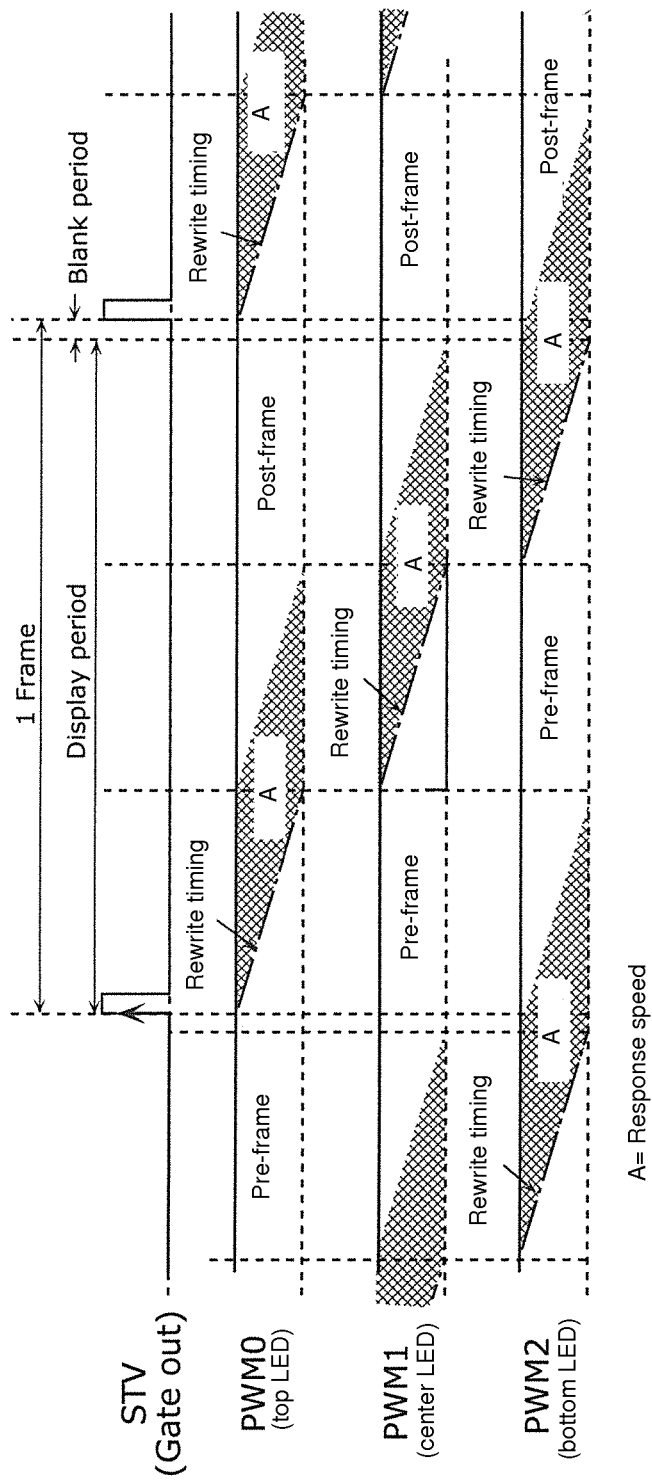
FIG. 21 is a timing chart showing in model form the lighting and extinguishing timing of the backlight panel and the write timing of the signal voltage to the liquid crystal panel in the liquid crystal display device according to Comparative Example 1.

The principle of double-imaging that occurs in a liquid crystal display device will be described first. FIG. 21 is a timing chart showing in model form the lighting and extinguishing timing of the backlight panel and the write timing of the signal voltage to the liquid crystal panel in the liquid crystal display device according to Comparative Example 1.

This liquid crystal display device includes a liquid crystal panel composed of liquid crystal pixel groups disposed in a matrix, a plurality of backlights provided so as to respectively correspond to the plurality of lines of the liquid crystal pixel groups, and a backlight drive circuit that drives the plurality of backlights.

The scan signal is written to the liquid crystal pixel groups by a gate driver that drives the top portion of the liquid crystal panel, a gate driver that drives the center portion of the liquid crystal panel, and a gate driver that drives the bottom portion of the liquid crystal panel. Each gate driver writes a signal voltage corresponding to the scan signal, which is digital data, to the liquid crystal panel. Here, writing a signal voltage to the liquid crystal panel refers to applying the signal voltage to the liquid crystal pixel groups that constitute the liquid crystal panel.

The plurality of backlights preferably are defined by light emitting diodes (LEDs), for example, and include LEDs arranged to correspond to the top portion of the liquid crystal panel (top LEDs), LEDs provided so as to correspond to the center portion of the liquid crystal panel (center LEDs), and LEDs arranged to correspond to the bottom portion of the liquid crystal panel (bottom LEDs).

The backlight drive circuit is equipped with a plurality of backlight drivers that drive the respective backlights and supplies the backlights with drive current that makes these backlights light during the lit periods of the backlights. During the high period of a scan signal PWM0, it supplies a drive current to the LEDs arranged to correspond to the top portion of the liquid crystal panel, during the high period of a scan signal PWM1, it supplies a drive current to the LEDs provided so as to correspond to the center portion of the liquid crystal panel, and during the high period of a scan signal PWM2, it supplies a drive current to the LEDs provided so as to correspond to the bottom portion of the liquid crystal panel.

Note that the lighting duty ratio is 100% in Comparative Example 1. That is, the scan signals PWM0 to PWM2 are always high, and the respective backlights are always lit.

The operation of the liquid crystal display device according to Comparative Example 1 will be described below.

When the gate driver start signal STV (which is a signal that indicates the timing for writing scan signals to the first line of the liquid crystal pixel group) rises, the liquid crystal display device writes the signal voltage to the liquid crystal panel by driving the various gate drivers in sequence.

The liquid crystal pixel line where the signal voltage is written transmits an amount of light in keeping with the signal voltage of the next frame, requiring an amount of time in keeping with the response speed of the liquid crystal pixels. Thus, the liquid crystal display device displays an image according to the scan signal of the next frame.

However, with such a liquid crystal display device, when the signal voltage is rewritten between the previous frame and the next frame, problematic blur can arise due to superimposition of images or the response speed of the liquid crystal. The plurality of backlights are on all the time because the lighting duty ratio is 100%, so these liquid crystal pixels transmit light from the backlights even during the response period of the liquid crystal pixels after the signal voltage is rewritten. Specifically, when the signal voltage is rewritten, the images of the pre-rewriting frame and the post-rewriting frame are displayed. In other words, a double image is displayed.

Comparative Example 2

In light of this, in order to suppress such double-imaging on the liquid crystal display device, a constitution is conceivable in which the lighting duty ratio is lowered, and when the signal voltage is rewritten, the corresponding backlight is extinguished.

Figure 22:
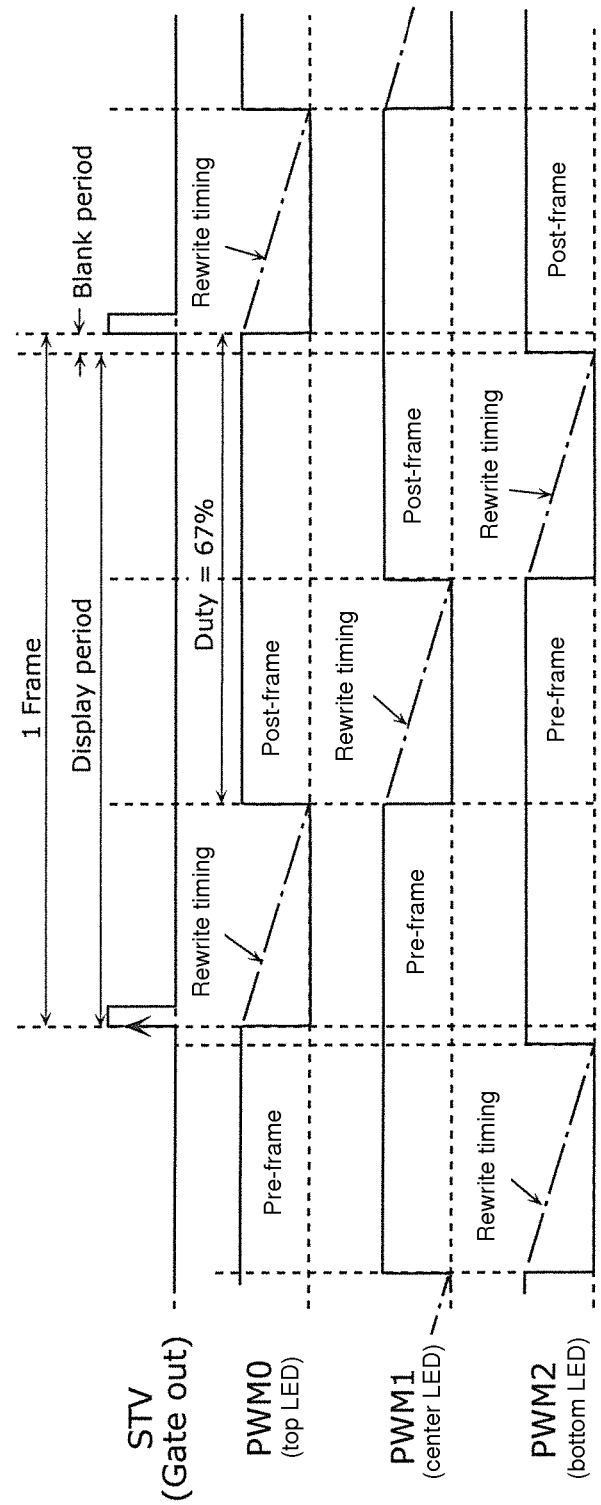
FIG. 22 is a timing chart showing in model form the lighting and extinguishing timing of the backlight panel and the write timing of the signal voltage to the liquid crystal panel in the liquid crystal display device according to Comparative Example 2.

FIG. 22 is a timing chart showing in model form the lighting and extinguishing timing of the backlight panel and the write timing of the signal voltage to the liquid crystal panel in the liquid crystal display device according to Comparative Example 2. Note that for the sake of simplicity of description, the description will assume that the response time of the liquid crystal pixels is zero in this comparative example.

As shown in FIG. 22, the liquid crystal display device according to Comparative Example 2 extinguishes the corresponding backlight at the write timing of the next scan signal. It makes the ON duty of the scan signals PWM0 to PWM2 equal to about $2/3$ (approximately 67%), and during rewriting of the signal voltages of the liquid crystal pixels, it makes the scan signals PWM0 to PWM2 low, thus extinguishing the corresponding backlights.

Consequently, double-imaging when signal voltages are rewritten is suppressed. Note that in the description, the response time of the liquid crystal pixels was zero. However, when the response time of the liquid crystal pixels is not zero, motion blur during the response time of the liquid crystal pixels is also suppressed by extinguishing the corresponding backlight during the response time of the liquid crystal pixels as well.

Figure 23:
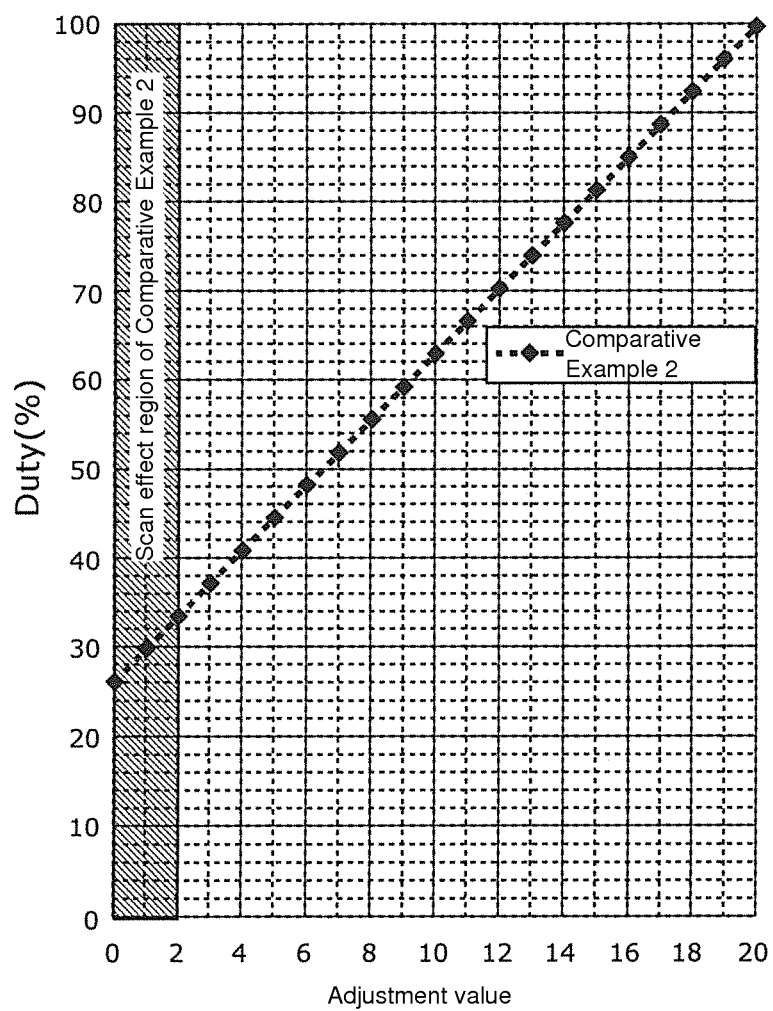
FIG. 23 is a graph showing the lighting duty ratio with respect to the adjustment value of the liquid crystal display device according to Comparative Example 2.

FIG. 23 is a graph showing the lighting duty ratio with respect to the adjustment value of the liquid crystal display device according to Comparative Example 2. Note that the "adjustment value" refers to a value that indicates the luminance of the backlights; the higher the adjustment value, the greater the luminance.

As shown in this figure, the higher the adjustment value, the higher the lighting duty ratio is because the backlights must emit light at a higher luminance. On the other hand, the lower the adjustment value, the lower the lighting duty ratio because the backlights can emit light at a lower luminance.

Here, the backlight of the liquid crystal display device according to Comparative Example 2 has a three-level constitution, and when the vertical scan period is Vs, the response speed of the liquid crystal pixel is, for example, $1/3$ Vs.

With such a liquid crystal display device according to Comparative Example 2, double-imaging is suppressed by setting the lighting duty ratio at about $1/3$ (approximately 33%) and extinguishing the backlight when signal voltages of liquid crystal pixels are rewritten and during the liquid crystal pixel response period. That is, double-imaging is suppressed with adjustment values which are such that the lighting duty ratio can be kept at or below about 33%. In other words, when the adjustment value results in a lighting duty ratio that exceeds about 33%, double-imaging suppressing effects will not be adequately manifested.

However, the only adjustment values that can make the lighting duty ratio about 33% or below are 0, 1, and 2. At other adjustment values (adjustment values of 3 or higher), the lighting duty ratio will be higher than about 33%, making double-imaging difficult to control. That is, it is difficult to suppress double-imaging in regions of high backlight luminance that result in adjustment values of 3 or higher.

Furthermore, because liquid crystal pixels use a hold drive, there are also problems of motion blur that is generated by retinal afterimages even when liquid crystal response times are shortened.

This motion blur can also be ameliorated by reducing the lighting duty ratio in a manner similar to the method of suppressing double-imaging described above.

FIGS. 24A and 24B are diagrams that illustrate motion blur, wherein FIG. 24A is a diagram indicating a case of a high lighting duty ratio, and FIG. 24B is a diagram indicating a case of a low lighting duty ratio.

As a comparison between FIGS. 24A and 24B makes clear, a smaller lighting duty ratio shown in FIG. 24B reduces motion blur. That is, the more the lighting duty ratio is reduced and backlight lighting brought closer to impulse-style lighting, the more motion blur is suppressed.

Thus, motion blur is suppressed by reducing the lighting duty ratio.

However, as shown in FIG. 23, reducing the lighting duty ratio results in lower backlight luminance. That is, it is difficult to apply methods that reduce the lighting duty ratio in order to suppress motion blur when backlights are putting out high luminance.

Thus, with the liquid crystal display devices according to Comparative Examples 1 and 2, there is a problem in that it is difficult to suppress double-imaging or motion blur when the backlights emit light at high luminance.

In order to solve such issues, the backlight drive circuits according to the various preferred embodiments of the present invention supply the following sorts of drive currents to each backlight. Namely, as the drive currents for the lit period of each backlight, the backlight drive circuits according to the various preferred embodiments of the present invention supply a first current when the adjustment value is a first adjustment value and supply a second current that has a higher current value than the first current when the adjustment value is a second adjustment value that is lower than the first adjustment value. Moreover, the lighting duty ratio to obtain a given luminance using the second current is smaller than the lighting duty ratio to obtain this same luminance using the first current.

Thus, the backlight drive circuit according to each of the preferred embodiments of the present invention makes the lighting duty ratio even smaller when the adjustment value is the second adjustment value. Accordingly, motion blur is suppressed even when the luminance of screen images is high. In addition, double-imaging also is suppressed by turning off the corresponding backlight before writing the signal voltage.

Preferred embodiments of the present invention will be described in detail below with reference to drawings. Note that the preferred embodiments described below are each for illustrating specific preferred examples of the present invention. The numerical values, shapes, materials, constituent elements, the disposed positions and connection formats of the constituent elements, and so forth shown in the preferred embodiments described below are just examples that do not limit the present invention. The present invention is specified by the scope of the claims. Therefore, those constituent elements not recited in the independent claims that are among the constituent elements in the preferred embodiments described below are not necessarily required in the present invention but are described as constituting a more preferable form.

The backlight drive circuits according to the preferred embodiments of the present invention drive a plurality of backlights that correspond to a plurality of lines of liquid crystal pixel groups disposed in a matrix, and they are included in televisions, for example.

Preferred Embodiment 1

The backlight drive circuit according to Preferred Embodiment 1 of the present invention is a backlight drive circuit that supplies drive current to a plurality of backlights, and it makes the lighting duty ratio (which is the proportion of the lit period within the flashing cycle of each backlight) larger as the adjustment value (which indicates the backlight luminance) is higher, and extinguishes each backlight before writing the signal voltage to the corresponding liquid crystal pixel group. Here, the backlight drive circuit supplies, during the lit period, a first current when the adjustment value exceeds a threshold value and supplies a second current that has a greater amperage than the first current when the adjustment value is at or below the threshold value. Furthermore, the lighting duty ratio to obtain a given luminance using the second current is made smaller than the lighting duty ratio to obtain this same luminance using the first current.

Consequently, the backlight drive circuit according to Preferred Embodiment 1 of the present invention suppresses double-imaging and motion blur even when the backlight emits light at high luminance.

The constitution of the backlight drive circuit according to Preferred Embodiment 1 of the present invention will be described below.

Figure 1:
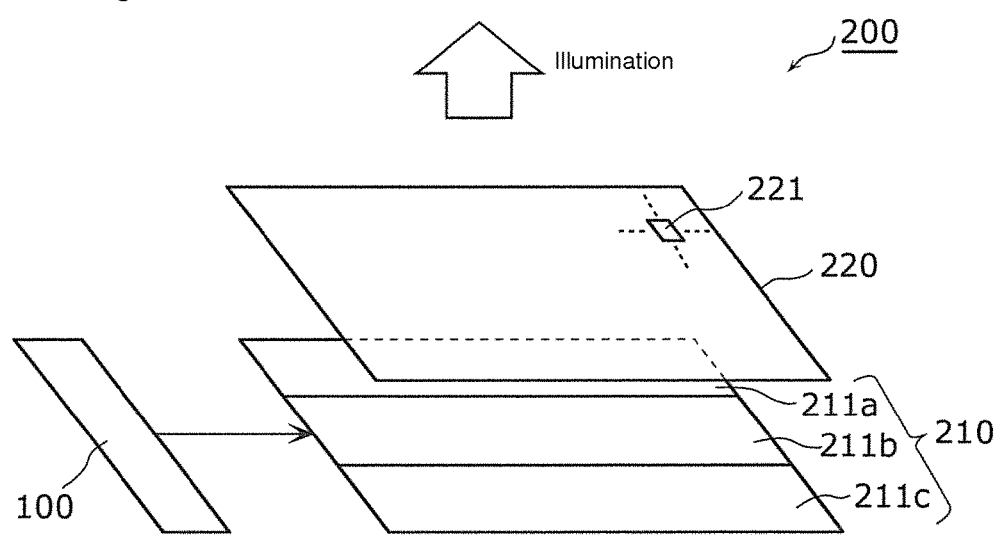
FIG. 1 is a block diagram showing the constitution of a liquid crystal display device in which the backlight drive circuit according to Preferred Embodiment 1 of the present invention is mounted.

FIG. 1 is a block diagram showing the constitution of a liquid crystal display device 200 in which the backlight drive circuit 100 according to Preferred Embodiment 1 of the present invention is mounted.

The liquid crystal display device 200 shown in this figure is a liquid crystal television, for example, including the backlight drive circuit 100 according to Preferred Embodiment 1 of the present invention, a backlight panel 210, and a liquid crystal panel 220 including liquid crystal pixel groups.

The backlight drive circuit 100 drives the backlight panel 210 by using adjustment values that are input externally and indicate the luminance of the backlight panel 210, signals that order the timing of lighting and extinguishing each backlight, and the like. The detailed constitution of the backlight drive circuit 100 will be described later.

The backlight panel 210 is disposed directly under the liquid crystal panel 220 and includes a plurality of backlights 211a to 211c. Note that in the present preferred embodiment, the backlight panel 210 preferably includes three backlights 211a to 211c, but the number of backlights is not limited to this; there may be 10 or 20, for example.

The individual backlights 211a to 211c are provided so as to correspond to a plurality of lines of the liquid crystal pixel groups that constitute the liquid crystal panel 220. The backlight 211a is provided so as to correspond to the top portion of the liquid crystal panel 220, the backlight 211b is provided so as to correspond to the center portion of the liquid crystal panel 220, and the backlight 211c is provided so as to correspond to the bottom portion of the liquid crystal panel 220. These backlights 211a to 211c include, for example, current-driven light-emitting elements such as LEDs. The luminance of the backlights 211a to 211c varies according to the amperage flowing through these backlights 211a to 211c.

Note that in the present preferred embodiment, each of the backlights 211a to 211c preferably is oblong, but the backlight shape is not limited to this; a square or substantially square shape is also possible. Moreover, in the present preferred embodiment, the individual backlights 211a to 211c are disposed so as to be aligned in the line direction, but the backlight disposition is not limited to this; they may also be disposed so as to be aligned in the column direction or disposed in a matrix. Hereinafter, no particular distinction may made among the backlights 211a to 211c, and they may be referred to simply as backlights 211.

The liquid crystal panel 220 preferably is a display panel that includes liquid crystal pixel groups disposed in a matrix (for example, 1920 columns by 1080 lines), and it displays images that correspond to scan signals input from outside of the liquid crystal display device 200.

The individual liquid crystal pixels 221 of this liquid crystal panel 220 include liquid crystal elements that include liquid crystal layers, pixel electrodes where signal voltage is applied, and counter-electrodes facing the pixel electrodes, as well as a thin-film transistors (TFTs) that apply signal voltages to the pixel electrodes of the liquid crystal elements. In the liquid crystal elements, the polarization direction of the light varies according to the signal voltage applied to the pixel electrode of the liquid crystal element through the TFT. The TFT applies the signal voltage that is output at the source lines provided for each column of the liquid crystal pixel groups from the source driver (not shown) to the pixel electrode of the liquid crystal pixel 221 of the corresponding column at the timing indicated by the high and low of the gate pulse that is output to the gate line provided on each line of the liquid crystal pixel groups from the gate driver (not shown). The TFT writes to the liquid crystal pixel 221. As a result, the liquid crystal panel 220 transmits light, with an amount of transmittance in keeping with the signal voltage written to each liquid crystal pixel 221 and indicating the luminance of the liquid crystal pixel 221, from the backlight 211 that corresponds to this liquid crystal pixel 221.

Figure 2:
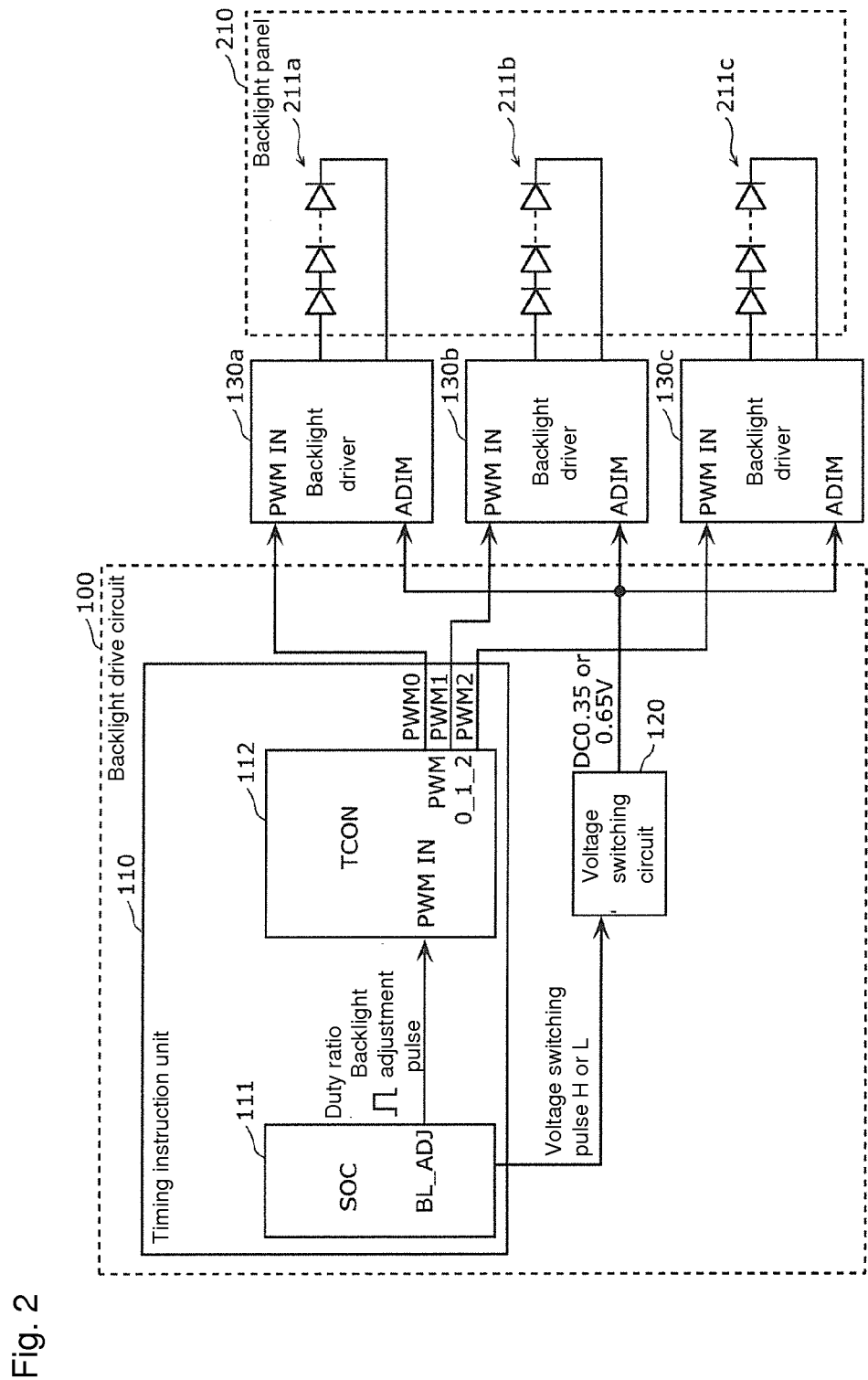
FIG. 2 is a block diagram showing the detailed constitution of the backlight drive circuit.

Next, the detailed constitution of the backlight drive circuit 100 will be described. FIG. 2 is a block diagram showing the detailed constitution of the backlight drive circuit 100.

The backlight drive circuit 100 shown in this figure includes a timing instruction unit 110, a voltage switching circuit 120, and backlight drivers 130a to 130c. Note that this figure also shows the backlight panel 210 to which drive current from the backlight drivers 130a to 130c is supplied.

The timing instruction unit 110 orders the lighting and extinguishing timing of the individual backlights 211 such that the higher the adjustment value, the longer the lit period of the backlights 211 are. The timing instruction unit 110 includes a system-on-chip (SOC) 111 and a timing controller (TCON) 112 and outputs pulse signals PWM0 to PWM2 that indicate the lighting and extinguishing timing of the respective backlights 211.

The SOC 111 generates the backlight adjustment pulse at a duty ratio in keeping with the adjustment value that indicates the luminance of the backlight panel 210. The higher that the adjustment value that indicates the luminance of the backlight panel 210 is, the higher the duty ratio of the backlight adjustment pulse it generates. The various backlights 211 of the backlight panel 210 light for a duration in keeping with the high period of this backlight adjustment pulse. That is, the higher the duty ratio of the backlight adjustment pulse, the longer that the backlights 211 are lit.

Here, the SOC 111 makes the duty ratio for the backlight adjustment pulse the normal duty ratio when the adjustment value that indicates the luminance of the backlight panel 210 is higher than a threshold value (e.g., 10) and makes the duty ratio for the backlight adjustment pulse smaller than the normal duty ratio when the adjustment value is at or below the threshold value. Note that the "normal duty ratio" refers to the duty ratio required to obtain the luminance of the backlight 211 corresponding to the relevant adjustment value by supplying a first current (to be described later) to the backlight 211. The lighting duty ratio to obtain a given luminance using the second current becomes smaller than the lighting duty ratio to obtain this same luminance using the first current.

In addition, the SOC 111 generates a voltage switching pulse that is high (hereinafter noted as "H") when the adjustment value that indicates the luminance of the backlight panel 210 is higher than the threshold value (e.g., 10) or low (hereinafter noted as "L") when it is at or below the threshold value, and then outputs it to the voltage switching circuit 120. Note that the threshold of the adjustment value that serves as the criterion for the SOC 111 to switch the voltage switching pulse between H and L is not limited to 10; it may be selected as appropriate to the usage environment and operating conditions of the liquid crystal display device 200 in which the backlight drive circuit 100 is mounted.

The TCON 112 outputs the backlight adjustment pulse that is input from the SOC 111 synchronous with the vertical sync signal supplied to the liquid crystal panel 220. The TCON 112 converts the backlight adjustment pulse so as to be synchronous with the vertical sync signal and generates pulse signals PWM0 to PWM2 that indicate the lighting and extinguishing timing of the respective backlights 211 by sequentially delaying the H period and L period.

The pulse signal PWM0 is a signal that controls the lighting and extinguishing timing of the backlight 211a, the H period of the pulse signal PWM0 corresponds to the lit period of the backlight 211a, and the L period of the pulse signal PWM0 corresponds to the extinguished period of the backlight 211a. The pulse signal PWM1 is a signal that controls the lighting and extinguishing timing of the backlight 211b, the H period of the pulse signal PWM1 corresponds to the lit period of the backlight 211b, and the L period of the pulse signal PWM1 corresponds to the extinguished period of the backlight 211b. The pulse signal PWM2 is a signal that controls the lighting and extinguishing timing of the backlight 211c, the H period of the pulse signal PWM2 corresponds to the lit period of the backlight 211c, and the L period of the pulse signal PWM2 corresponds to the extinguished period of the backlight 211c.

The three backlights 211a to 211c are sequentially lit and extinguished by such pulse signals PWM0 to PWM2.

Here, the TCON 112 switches the respective pulse signals PWM0 to PWM2 to L before the signal voltage is written to the liquid crystal pixel groups of the lines that correspond to the backlights 211a to 211c. Vertical sync signals and horizontal sync signals are used to detect the times at which the signal voltage will be written to the liquid crystal pixel groups of the lines that correspond to the backlights 211a to 211c and to switch the pulse signals PWM0 to PWM2 which correspond to the backlights 211a to 211c to L before the detected times.

The respective backlights 211a to 211c are thus extinguished before the signal voltage is written to the liquid crystal pixel groups of the lines that correspond to the backlights 211a to 211c. Accordingly, double-imaging caused by lighting of the backlights 211 when signal voltages are written is significantly reduced or prevented.

The voltage switching circuit 120 is merely one example of the voltage generating unit according to a preferred embodiment of the present invention. When the adjustment value is higher than the threshold value, it generates a first voltage, and when the adjustment value is at or below the threshold value, it generates a second voltage that is higher than the first voltage. When the voltage switching pulse that is output from the SOC 111 is H, it generates a first voltage (e.g., about 0.35V), and when the pulse is L, the circuit generates a second voltage that is higher than the first voltage (e.g., about 0.65V). The detailed constitution of this voltage switching circuit 120 will be described later.

Note that the first voltage and the second voltage are not limited to this. For example, the first voltage may be about 0.40V, and the second voltage may be about 0.60V, or the first voltage may be about 0.45V, and the second voltage may be about 0.55V; they may be selected as appropriate to the usage environment and operating conditions of the liquid crystal display device 200 in which the backlight drive circuit 100 is mounted.

The backlight drivers 130a to 130c supply the backlight panel 210 with the drive current that makes the respective backlights 211a to 211c light. The backlight driver 130a is installed for the backlight 211a, the backlight driver 130b is installed for the backlight 211b, the backlight driver 130c is installed for the backlight 211c, and these drivers supply drive current to the corresponding backlights 211a to 211c. Hereinafter, the backlight drivers 130a to 130c may be referred to as backlight drivers 130 without making any particular distinction among them.

The various backlight drivers 130 convert the first voltage generated by the voltage switching circuit 120 into a first current, convert the second voltage into a second current, and supply the respective backlights 211 with the converted currents as their drive currents for the lighting period of these backlights 211 as ordered by the timing instruction unit 110.

The backlight driver 130a converts the voltage generated by the voltage switching circuit 120 into a current and supplies the converted current to the backlight 211a as the drive current for this backlight 211a during the H period of the pulse signal PWM0 which is input from the TCON 112. During the L period of the pulse signal PWM0, on the other hand, it stops supply of the drive current to the backlight 211a. The backlight 211a is lit during the H period of the pulse signal PWM0, while the backlight 211a is extinguished during the L period of the pulse signal PWM0.

Similarly, the backlight driver 130b converts the voltage generated by the voltage switching circuit 120 into a current and supplies the converted current to the backlight 211b as the drive current for this backlight 211b during the H period of the pulse signal PWM1 which is input from the TCON 112. During the L period of the pulse signal PWM1, on the other hand, it stops supply of the drive current to the backlight 211b. The backlight 211b is lit during the H period of the pulse signal PWM1, while the backlight 211b is extinguished during the L period of the pulse signal PWM1.

Similarly, the backlight driver 130c converts the voltage generated by the voltage switching circuit 120 into a current and supplies the converted current to the backlight 211c as the drive current for this backlight 211c during the H period of the pulse signal PWM2 which is input from the TCON 112. During the L period of the pulse signal PWM2, on the other hand, it stops supply of the drive current to the backlight 211c. The backlight 211c is lit during the H period of the pulse signal PWM2, while the backlight 211c is extinguished during the L period of the pulse signal PWM2.

Here, the voltage generated by the voltage switching circuit 120 is a first voltage (e.g., about 0.35 V) when the voltage switching pulse is H and is a second voltage that is higher than the first voltage (e.g., about 0.65 V) when the pulse is L as described above. That is, it is a first voltage (e.g., 0.35 V) when the adjustment value that indicates the luminance of the backlight panel 210 is higher than the threshold value (e.g., 10) and a second voltage (e.g., about 0.65 V) when it is at or below the threshold value.

Therefore, the current supplied by the backlight drivers 130a to 130c to the corresponding backlights 211a to 211c during the H period of the corresponding pulse signals PWM0 to PWM2 switches according to the adjustment value. A first current (e.g., about 350 mA) corresponding to the first voltage is supplied when the adjustment value is higher than the threshold value, and a second current (e.g., about 650 mA) corresponding to the second voltage is supplied when the adjustment value is at or below the threshold value.

As a result, the backlights 211a to 211c emit light due to the first current during the H period of the pulse signals PWM0 to PWM2 when the adjustment value is higher than the threshold value, and they emit light due to the second current during the H period of the pulse signals PWM0 to PWM2 when the adjustment value is at or below the threshold value.

Therefore, the liquid crystal display device 200 mounted with the backlight drive circuit 100 according to the present preferred embodiment achieves a luminance of the backlight panel 210 equivalent to the liquid crystal display devices according to Comparative Examples 1 and 2 even when the H periods of the pulse signals PWM0 to PWM2 are shorter than the duty ratios of the liquid crystal display devices according to Comparative Examples 1 and 2 in the case of the adjustment value being at or below the threshold value.

That is, when the adjustment value is at or below the threshold value, lighting of the backlights 211a to 211c approaches impulse-style lighting. Motion blur is thus ameliorated.

Figure 3:
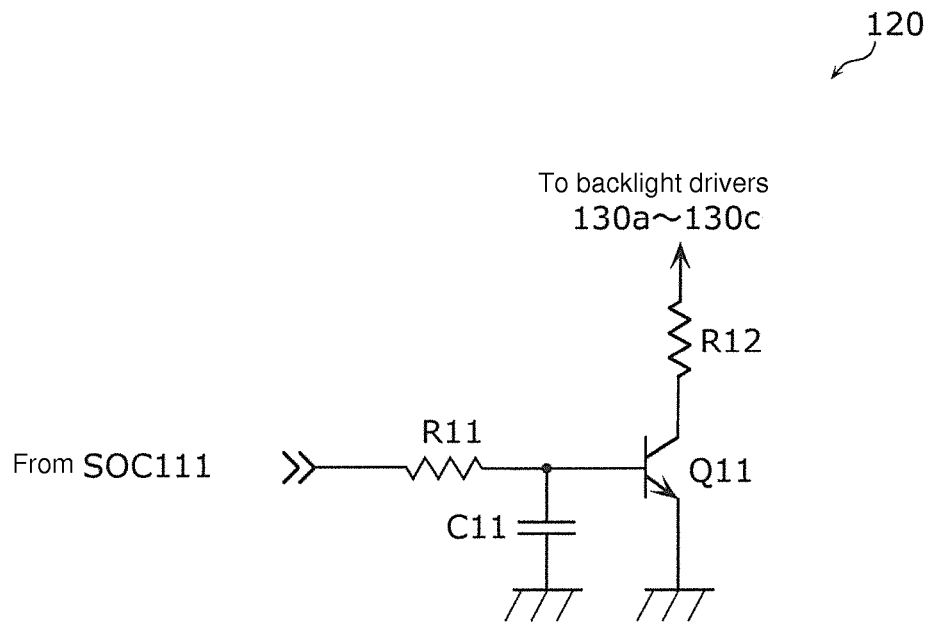
FIG. 3 is a circuit diagram showing one example of the detailed constitution of the voltage switching circuit.

Next, the detailed constitution of the voltage switching circuit 120 in the present preferred embodiment will be described. FIG. 3 is a circuit diagram showing one example of the detailed constitution of the voltage switching circuit 120.

The voltage switching circuit 120 includes resistors R11 and R12, a capacitor C11, and a transistor Q11.

The capacitor C11 is a capacitor element that removes noise.

The transistor Q11 is grounded at its emitter and its collector is connected to each of the backlight drivers 130a to 130c via the resistor R12, and the voltage switching pulse that is output from the SOC 111 is input to the base via the resistor R11. Therefore, when the voltage switching pulse is H, the collector of the transistor Q11 becomes the L voltage (ground potential); when the voltage switching pulse is L, the collector of the transistor Q11 become the H voltage. The transistor Q11 is an inverter circuit that inverts the voltage switching pulse that was input.

The resistor R12 is a voltage-dividing resistor that determines the H and L voltages output from the voltage switching circuit 120 and that is inserted between the collector of the transistor Q11 and the backlight drivers 130a to 130c. That is, of the pins of the resistor R12, the voltage of the pin that is not connected to the collector of the transistor Q11 is the voltage that is output from the voltage switching circuit 120. When the collector of the transistor Q11 is the L voltage, the output voltage of the voltage switching circuit 120 is the voltage obtained when the resistor R12 divides the specified voltage determined by the circuit provided between the voltage switching circuit 120 and the backlight drivers 130a to 130c. Meanwhile, when the collector of the transistor Q11 is the H voltage, the output voltage of the voltage switching circuit 120 is the actual specified voltage determined by the circuit provided between the voltage switching circuit 120 and the backlight drivers 130*a* to 130*c*. Thus, when the collector of the transistor Q11 is the L voltage, the output voltage of the voltage switching circuit 120 is the first voltage, which is the voltage obtained by dividing the specified voltage by the resistor, and when the collector of the transistor Q11 is the H voltage, it is the second voltage, which is the specified voltage. That is, the second voltage is higher than the first voltage.

Therefore, the voltage switching circuit 120 generates a first voltage when the voltage switching pulse is H and a second voltage that is higher than the first voltage when the voltage switching pulse is L. When the adjustment value is higher than the threshold value, the circuit generates a first voltage; when the adjustment value is at or below the threshold value, the circuit generates a second voltage that is higher than the first voltage.

As was described above, the backlight drive circuit 100 according to the present preferred embodiment makes the lighting duty ratio of each backlight 211 larger as the adjustment value (which indicates backlight luminance) is higher, and it extinguishes each backlight 211 prior to writing the signal voltage to the liquid crystal pixel groups. Here, the backlight drive circuit 100 supplies the first current during the lit periods of the backlights 211 when the adjustment value exceeds the threshold value, and it supplies the second current (which has greater amperage than the first current) during the lit periods of the backlights 211 when the adjustment value is at or below the threshold value. In addition, when the adjustment value exceeds the threshold value, the lighting duty ratios of the backlights 211 are changed to the normal duty ratio; when it is at or below the threshold value, the lighting duty ratios of the backlights 211 are made smaller than the normal duty ratio.

Here, the "normal duty ratio" refers to the duty ratio required to obtain the luminance of the backlight 211 corresponding to the relevant adjustment value by supplying the first current to the backlight 211 as described above.

Next, the operation of the liquid crystal display device 200 in the present preferred embodiment will be described with reference to the drawings.

Figure 4:
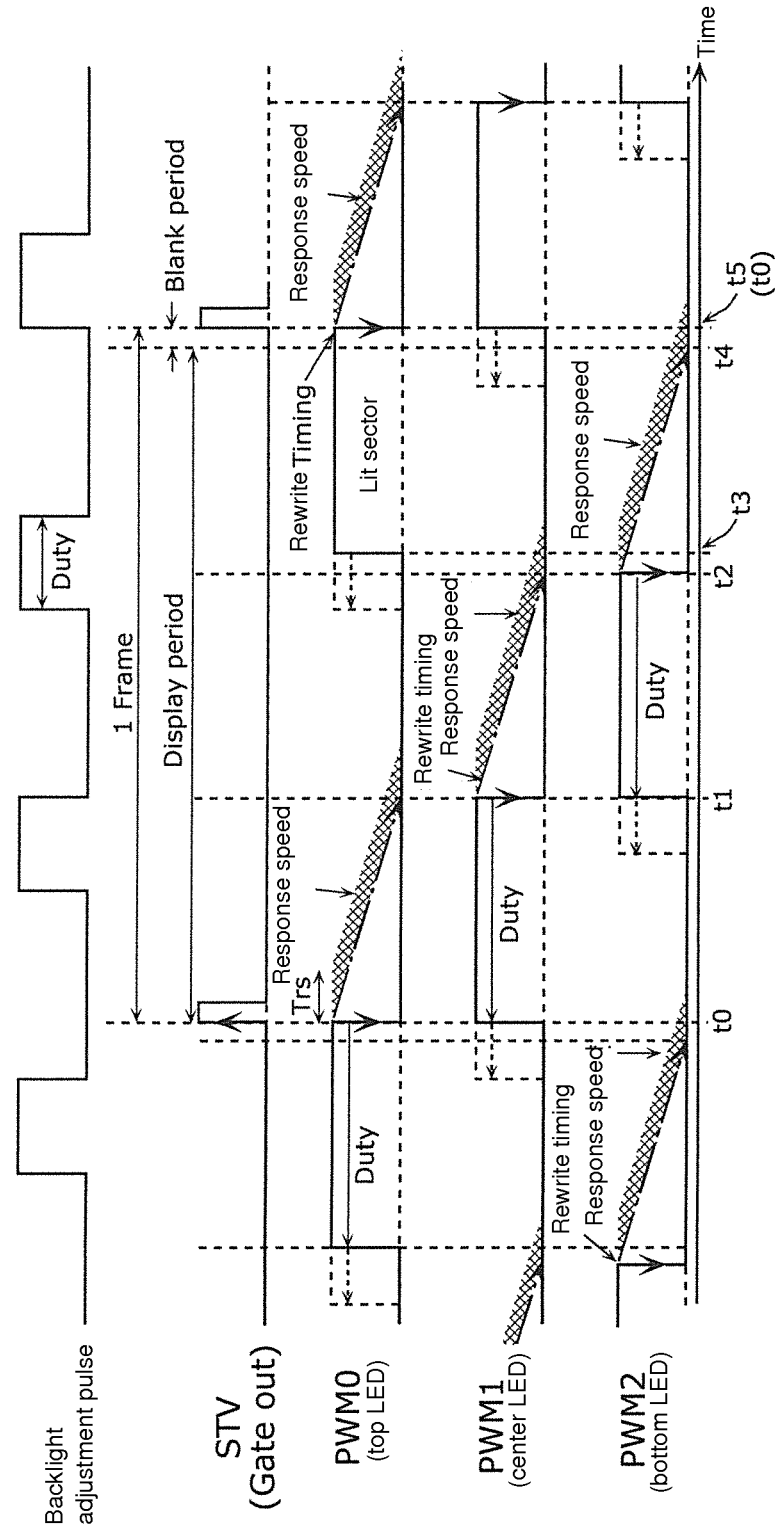
FIG. 4 is a timing chart showing in model form one example of the lighting and extinguishing timing of the backlight panel and the write timing of the signal voltage to the liquid crystal panel in Preferred Embodiment 1 of the present invention.

FIG. 4 is a timing chart showing in model form the lighting and extinguishing timing of the backlight panel 210 and the write timing of the signal voltage to the liquid crystal panel 220.

FIG. 4 shows in model form, in order from top, the backlight adjustment pulse, the vertical sync signal STV, the pulse signal PWM0 that corresponds to the backlight 211*a* with the rewrite timing of the signal voltage to the liquid crystal pixels 221 of the pixel line corresponding to the backlight 211*a*, the pulse signal PWM1 that corresponds to the backlight 211*b* with the rewrite timing of the signal voltage to the liquid crystal pixels 221 of the pixel line corresponding to this backlight 211*b*, and the pulse signal PWM2 that corresponds to the backlight 211*c* with the rewrite timing of the signal voltage to the liquid crystal pixels 221 of the pixel line corresponding to this backlight 211*c*.

As shown in this figure, the duty ratio is the same for the backlight adjustment pulse generated by the SOC 111 and for the various pulse signals PWM0 to PWM2. The pulse signals PWM0 to PWM2 are signals that delay pulse signals that have the same duty ratio as the backlight adjustment pulse by the specified length of time each within a single display period.

First, at time t0, when the vertical sync signal STV rises, the writing of signal voltage start, in order by line, for the various liquid crystal pixels 221 of the top portion of the liquid crystal panel 220, which corresponds to the backlight 211*a*. When this happens, the pulse signal PWM0 will have changed to L by time t0. That is, by the time writing starts to each of the liquid crystal pixels 221 of the top portion of the liquid crystal panel 220, the backlight drive circuit 100 will have extinguished the backlight 211*a*, which corresponds to the top portion of the liquid crystal panel 220.

From that point until time t1, a signal voltage is written to each of the liquid crystal pixels 221 of the top portion of the liquid crystal panel 220. Here, the time required from the writing of the signal voltage to the liquid crystal pixels 221 until the liquid crystal pixels transmit the amount of light corresponding to the written signal voltage is the response speed time Trs. This response speed is determined by the constitution, materials, and the like of these liquid crystal pixels 221. Therefore, each of the liquid crystal pixels 221 is made to transmit an amount of light that corresponds to the written signal voltage after the signal voltage is written.

At time t0, furthermore, the pulse signal PWM1 rises to H. The backlight drive circuit 100 switches the backlight 211*b*, which corresponds to the center portion of the liquid crystal panel 220, from extinguished to lit. Consequently, an image in keeping with the signal voltage written in the previous frame is displayed in the center portion of the liquid crystal panel 220.

From that point until just before time t1, the backlight drive circuit 100 lights the backlight 211*b*. Therefore, from time t0 until just before time t1, an image in keeping with the signal voltage written in the previous frame is displayed in the center portion of the liquid crystal panel 220.

Next, at time t1, the writes of signal voltage start, in order by line, for the various liquid crystal pixels 221 of the center portion of the liquid crystal panel 220, which corresponds to the backlight 211*b*. When this happens, the pulse signal PWM1 is L just before time t1. By the time writing starts to the various liquid crystal pixels 221 of the center portion of the liquid crystal panel 220, the backlight drive circuit 100 will have extinguished the backlight 211*b*, which corresponds to the center portion of the liquid crystal panel 220. From that point until time t2, a signal voltage is written to the various liquid crystal pixels 221 of the center portion of the liquid crystal panel 220.

Moreover, at time t1, the pulse signal PWM2 rises to H. The backlight drive circuit 100 switches the backlight 211*c*, which corresponds to the bottom portion of the liquid crystal panel 220, from extinguished to lit. As a result, an image in keeping with the signal voltage written in the previous frame is displayed in the bottom portion of the liquid crystal panel 220.

From that point until just before time t2, the backlight drive circuit 100 lights the backlight 211*c*. Consequently, from time t1 until just before time t2, an image in keeping with the signal voltage written in the previous frame is displayed in the bottom portion of the liquid crystal panel 220.

Next, at time t2, the writes of signal voltage start, in order by line, for the various liquid crystal pixels 221 of the bottom portion of the liquid crystal panel 220, which corresponds to the backlight 211*c*. When this happens, the pulse signal PWM2 is L just before time t2. By the time writing starts to the various liquid crystal pixels 221 of the bottom portion of the liquid crystal panel 220, the backlight drive circuit 100 will have extinguished the backlight 211*c*, which corresponds to the bottom portion of the liquid crystal panel 220. From that point until time t4, a signal voltage is written to the various liquid crystal pixels 221 of the bottom portion of the liquid crystal panel 220.

Next, at time t3, the pulse signal PWM0 rises to H. The backlight drive circuit 100 switches the backlight 211a, which corresponds to the top portion of the liquid crystal panel 220, from extinguished to lit. As a result, an image in keeping with the signal voltage written just before (between times t0 and t1) is displayed in the top portion of the liquid crystal panel 220.

From that point until just before time t5, the backlight drive circuit 100 lights the backlight 211a. Consequently, from time t3 until just before time t5, an image in keeping with the signal voltage written in the previous frame is displayed in the top portion of the liquid crystal panel 220.

Afterwards, at time t5, the vertical sync signal STV rises, just as at time t0, and the operation described above is repeated thereafter. That is to say, the time between t0 and t5 is the period of a single frame on the liquid crystal panel 220.

Here, the time between t4 and t5 is the vertical blanking period (blank period), and t3 is the time after the vertical blanking period elapses from time t2. Therefore, the time of the lit period of the backlight 211a (t3 to t5), the time of the lit period of the backlight 211b (t0 to t1), and the time of the lit period of the backlight 211c (t1 to t2) are the same.

Thus, the liquid crystal display device 200 that is mounted with the backlight drive circuit 100 according to the present preferred embodiment extinguishes the backlight 211a before the signal voltage is written at time t0 (=t5) to the liquid crystal pixel group of the top portion of the liquid crystal panel 220, which corresponds to the backlight 211a. In addition, the backlight 211b is extinguished before the signal voltage is written at time t1 to the liquid crystal pixel group of the center portion of the liquid crystal panel 220, which corresponds to the backlight 211b. Furthermore, the backlight 211c is extinguished before the signal voltage is written at time t3 to the liquid crystal pixel group of the bottom portion of the liquid crystal panel 220, which corresponds to the backlight 211c.

As a result, double-imaging when signal voltages are rewritten is significantly reduced or prevented. Moreover, motion blur during the response period of the liquid crystal pixels 221 is also significantly reduced or prevented by extinguishing the corresponding backlights 221a to 221c during the response period of the liquid crystal pixels 221 as well.

Note that in the above description, the lit periods of the respective backlights 211a to 211c preferably did not overlap. However, the lit periods of the backlights 211a to 211c are not limited to this. For example, by accelerating the rises of the respective pulse signals PWM0 to PWM2 as indicated by the dotted line in FIG. 4, the start-of-lighting-time of the respective backlights 211a to 211c may be accelerated. By doing so, a longer lit period is ensured in each of the backlights 211a to 211c within a single frame, and the same luminance is even if the current per unit time supplied to each of 211a to 211c is decreased. Here, when accelerating the rises of the respective pulse signals PWM0 to PWM2, the effects described above are exhibited by making the rises of the pulse signals PWM0 to PWM2 not overlap the write periods and response periods of the liquid crystal pixel groups that correspond to these pulse signals PWM0 to PWM2. That is, it is possible to significantly reduce or prevent double-imaging when signal voltages are rewritten and during the response period of the liquid crystal pixels 221.

As was described above, the drive current supplied during the period when the individual backlights 211 are made to light in the backlight drive circuit 100 according to the present preferred embodiment is a first current when the adjustment value is higher than the threshold value and a second current that is higher than the first current when the adjustment value is at or below the threshold value. In addition, the lighting duty ratio is the normal duty ratio when the adjustment value is higher than the threshold value and smaller than the normal duty ratio when the adjustment value is at or below the threshold value. The drive current during the lit periods of the backlights 211 and the lighting duty ratios of the backlights 211 will be described below with reference to FIGS. 5 and 6.

Figure 5:
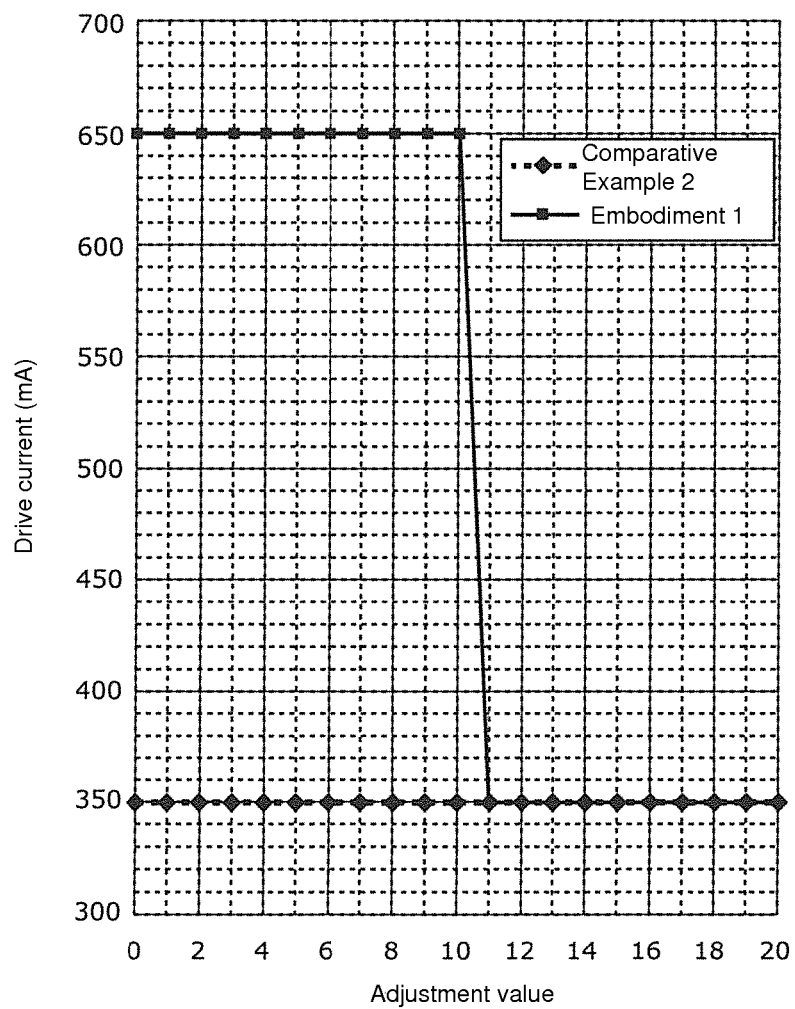
FIG. 5 is a graph showing drive current during the lit periods of the backlights with respect to the adjustment value.

FIG. 5 is a graph showing drive current during the lit periods of the backlights 211 with respect to the adjustment value. Note that this figure shows the drive current supplied to the backlights 211 in Preferred Embodiment 1 and the drive current supplied to the backlights in Comparative Example 2 described above.

As shown in this figure, in Comparative Example 2, the drive current supplied to the backlight is always a constant current of about 350 mA (the first current) regardless of the adjustment value. By contrast, the backlight drive circuit 100 according to the present preferred embodiment supplies the first current of about 350 mA to the backlights 211 just as in Comparative Example 2 when the adjustment value is higher than the threshold value of 10, and it supplies a second current of about 650 mA whose current value is higher than the first current to the backlights 211 when the adjustment value is at or below the threshold value.

The first current and the second current may be determined as follows: when the backlights 211 are constituted of LEDs, the rated current that can flow through the backlights 211 differs according to the lighting duty ratios; the lower the lighting duty ratio, the higher the rated current. Therefore, it is also possible to set the LED rated current in the case of a lighting duty ratio of 100% as the first current and set the LED rated current in the case of a lighting duty ratio of about 33% as the second current.

Figure 6:
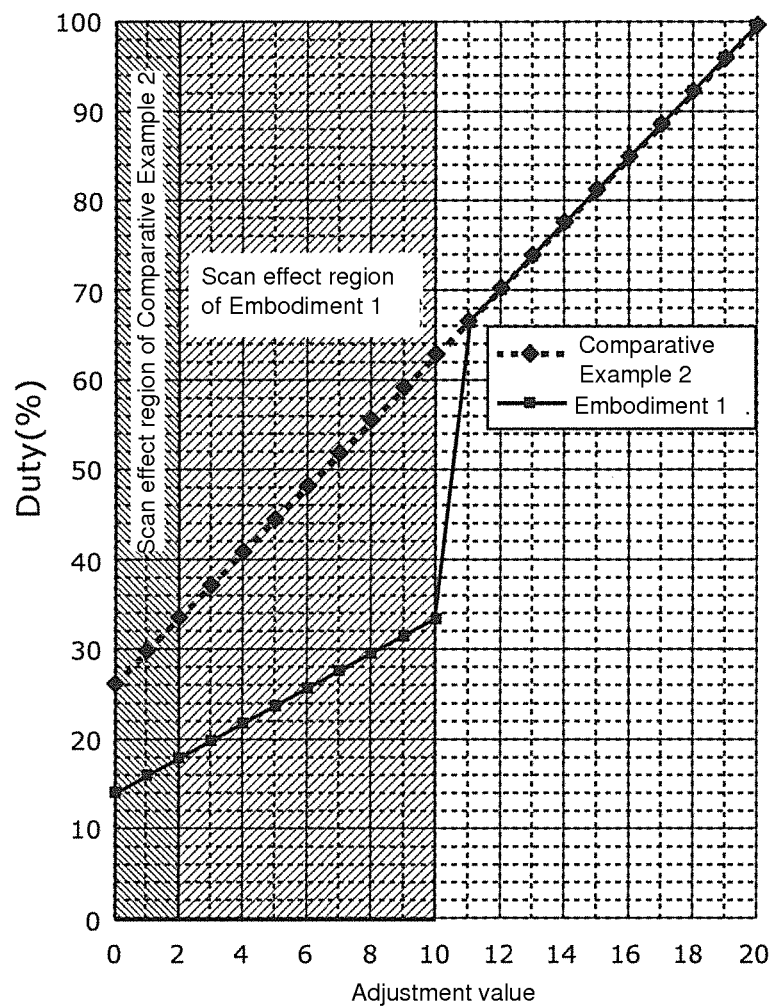
FIG. 6 is a graph showing the lighting duty ratios of the backlights with respect to the adjustment values.

FIG. 6 is a graph showing the lighting duty ratios of the backlights 211 with respect to the adjustment values.

As shown in this figure, in Comparative Example 2, the lighting duty ratio of the backlights 211 is linear with respect to the adjustment value. In contrast to this, the lighting duty ratio of the backlights 211 from the backlight drive circuit 100 according to the present preferred embodiment is a similar duty ratio to Comparative Example 2 when the adjustment value is higher than the threshold value of 10. On the other hand, when the adjustment value is at or below the threshold value, the duty ratio is approximately half the duty ratio of Comparative Example 2.

Because of this, motion blur and double-imaging are significantly reduced or prevented with the liquid crystal display device 200 in the present preferred embodiment compared to the liquid crystal display device according to Comparative Example 2 when the adjustment value is 10 or below. The reasons for this will be described while explaining the adjustment value region in which the scan effect of the liquid crystal display device according to Comparative Example 2 appears and the adjustment value region in which the scan effect of the liquid crystal display device 200 in the present preferred embodiment appears, when the backlights 211 have a three-stage constitution and the response speed of the liquid crystal pixels 221 is about ⅓ Vs, which is one-third of a single vertical scan cycle (i.e., Vs). Note that the scan effect refers to suppression of double-imaging by sequentially lighting and extinguishing the plurality of backlights 211.

In both the liquid crystal display device according to Comparative Example 2 and the liquid crystal display device 200 in the present preferred embodiment, in order to obtain the scan effect, the backlight must be made to not light during the time required to write the signal voltage to the liquid crystal pixel groups that correspond to each backlight and during the response period of the liquid crystal pixels 221 in which the signal voltage is written. Here, the time required to write the signal voltage to the liquid crystal pixels 221 of the line that corresponds to a single backlight 211 is approximately ⅓ Vs as described above, and the response speed of the liquid crystal pixels 221 is also approximately ⅓ Vs, for example. Therefore, in both the liquid crystal display device according to Comparative Example 2 and the liquid crystal display device 200 in the present preferred embodiment, in order to obtain the scan effect, the backlight must be made to light for a period that subtracts the time required to write the signal voltage and the response period of the liquid crystal pixels 221 from a single vertical scan period. That is, the scan effect can be obtained when the adjustment value allows a backlight lit period of approximately ⅓ Vs, i.e., a backlight lighting duty ratio of about 33% or less.

Here, the adjustment values that are able to make the lighting duty ratios of the backlights of about 33% or less will be confirmed using FIG. 6.

With the liquid crystal display device according to Comparative Example 2, as shown in FIG. 6, the only adjustment values that can result in a backlight lighting duty ratio at or below about 33% are 0, 1, and 2. At other adjustment values (adjustment values of 3 or higher), the backlight lighting duty ratio will be higher than about 33%, making it difficult to obtain a scan effect. That is, with the liquid crystal display device according to Comparative Example 2, the scan effect can be obtained only in the region in which the adjustment value is 0, 1, or 2.

With the liquid crystal display device 200 in the present preferred embodiment, on the other hand, the adjustment values that are able to make the lighting duty ratios of the backlights about 33% or less are 0 to 10. That is, with the liquid crystal display device 200 in the present preferred embodiment, the scan effect can be obtained in the region in which the adjustment value is 10 or below. Thus, the scan effect can be obtained even in regions in which the adjustment value is large compared to the liquid crystal display device according to Comparative Example 2. To wit, the scan effect can be obtained even when the backlights 211 emit light at higher luminance than the liquid crystal display device according to Comparative Example 2.

Thus, with the backlight drive circuit 100 according to Preferred Embodiment 1 of the present invention, the drive current supplied to the backlights 211 is the first current when the adjustment value is above the threshold value, and it is the second current which is higher than the first current when the adjustment value is at or below the threshold value. Furthermore, the lighting duty ratio of a backlight 211 is the normal duty ratio when the adjustment value is higher than the threshold value; when the adjustment value is at or below the threshold value, the ratio is made smaller than the normal duty ratio. Therefore, motion blur is significantly reduced or prevented even when the luminance of the backlight panel 210 is high.

Moreover, the backlight drive circuit 100 according to Preferred Embodiment 1 of the present invention extinguishes each backlight 211 before writing the signal voltage to the liquid crystal pixel group of the line that corresponds to this backlight 211. Accordingly, it is possible to significantly reduce or prevent double-imaging that is caused by the fact that, when the signal voltage is written to liquid crystal pixels 221, the backlight 211 that corresponds to these liquid crystal pixels 221 ends up being lit.

Figure 7:
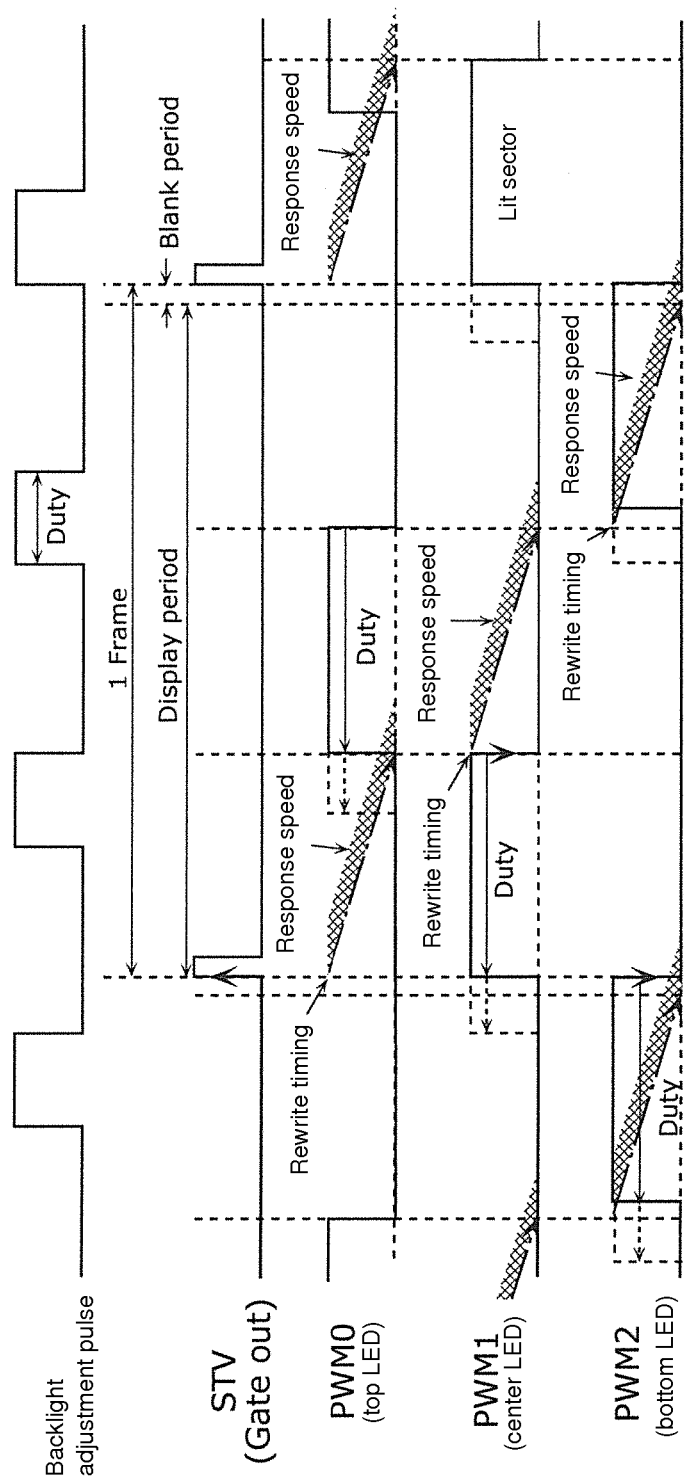
FIG. 7 is a timing chart showing in model form the lighting and extinguishing timing of the backlight panel and the write timing of the signal voltage to the liquid crystal panel in a comparative example for Preferred embodiment 1.

FIG. 7 is a timing chart showing in model form, as a comparative example for Preferred Embodiment 1, the timing of writing the signal voltage to the liquid crystal panel and the lighting and extinguishing timing of the backlight panel in cases where during the writing of the signal voltage to liquid crystal pixels, the backlight that corresponds to these liquid crystal pixels is lit.

As shown in this figure, when the scanning sequence of lighting and extinguishing the backlight panel differs from the scanning sequence of writing the signal voltage to the liquid crystal panel, there are cases in which during the writing of the signal voltage to liquid crystal pixels, the backlight that corresponds to these liquid crystal pixels ends up being lit.

Accordingly, in order to significantly reduce or prevent double-imaging, it is important to match the scanning sequence of lighting and extinguishing the backlight panel 210 to the scanning sequence of writing the signal voltage to the liquid crystal panel 220 and to extinguish each backlight 211 before writing the signal voltage to the liquid crystal pixel group of the line that corresponds to this backlight 211, as with the backlight drive circuit 100 according to Preferred Embodiment 1 of the present invention.

Figure 8:
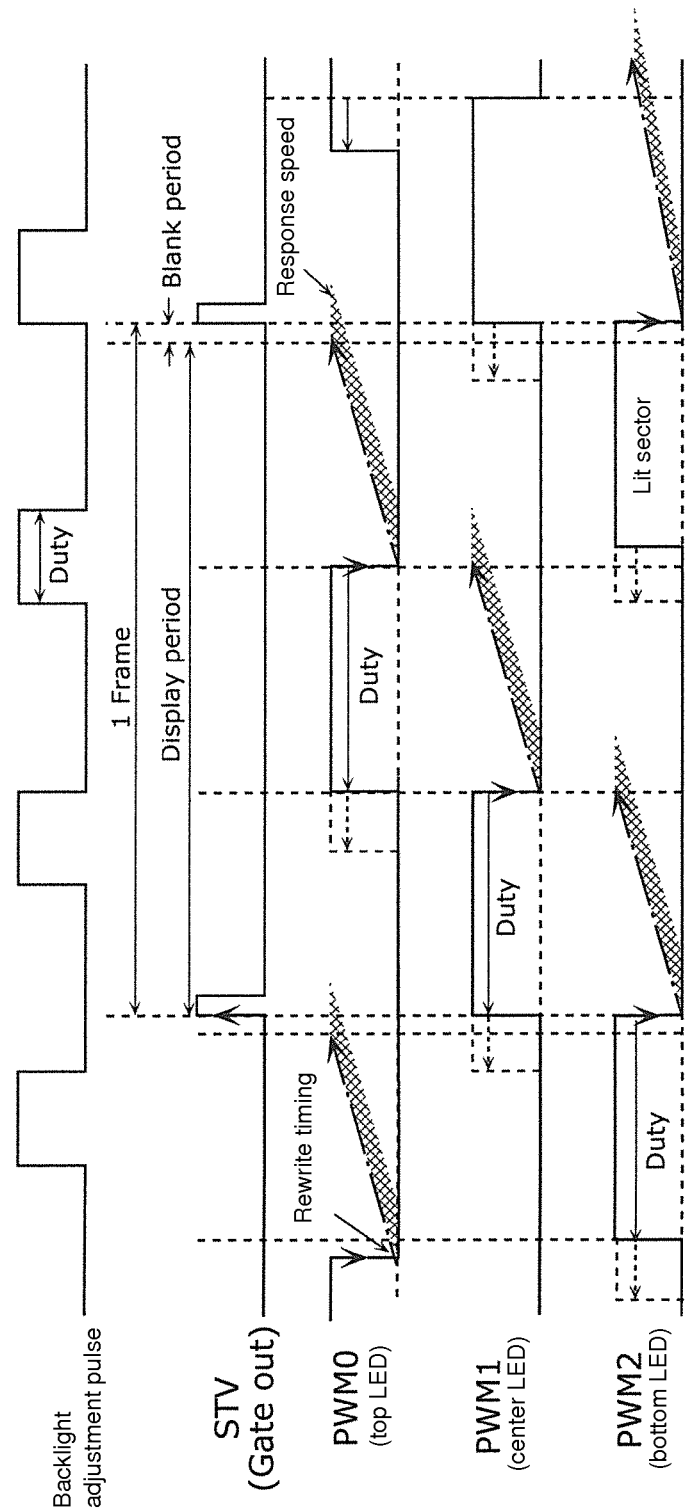
FIG. 8 is a timing chart showing in model form another example of the lighting and extinguishing timing of the backlight panel and the write timing of the signal voltage to the liquid crystal panel in Preferred Embodiment 1 of the present invention.

Note that in FIG. 4, a normal scan was shown, in which the scan of lighting and extinguishing the backlight panel 210 and the scan of writing the signal voltage to the liquid crystal panel 220 moves from the top of the backlight panel 210 and liquid crystal panel 220 to the bottom, However, a reverse scan that moves from bottom to top, as shown in FIG. 8, may also be used.

In addition, during the response period of the liquid crystal pixels 221 whose signal voltage was rewritten, the backlight drive circuit 100 according to Preferred Embodiment 1 of the present invention also halts supply of drive current to the backlight 211 that corresponds to these liquid crystal pixels 221. That is, it extinguishes this backlight 211. As a result, it is possible to significantly reduce or prevent double-imaging arising from the backlight 211 that corresponds to the relevant liquid crystal pixels 221 ending up being lit during the response period of these liquid crystals 221.

Note that in the above description, the backlight drive circuit 100 preferably halted supply of drive current to the backlight 211 that corresponds to the relevant liquid crystal pixels 221 during the response period of these liquid crystal pixels 221 whose signal voltage was rewritten, but the backlight drive circuit 100 may also supply drive current to the backlight 211 that corresponds to these liquid crystal pixels 221 during the response period of the liquid crystal 221 whose signal voltage was rewritten. The reason for this will be described below.

The amount transmitted by the liquid crystal pixels 221 whose signal voltage was rewritten changes abruptly immediately after it is rewritten, but changes in its amount transmitted are moderate thereafter. Therefore, during the period after the changes in the transmitted amount are moderate during the response period of the liquid crystal pixels 221 whose signal voltage was rewritten, motion blur is not conspicuous even when the backlight 211 is lit by the supply of drive current to the backlight 211. Therefore, during the response period of the liquid crystal pixels 221 whose signal voltage was rewritten, the backlight drive circuit 100 may supply drive current to the backlight 211 that corresponds to these liquid crystal pixels 221.

Figure 10:
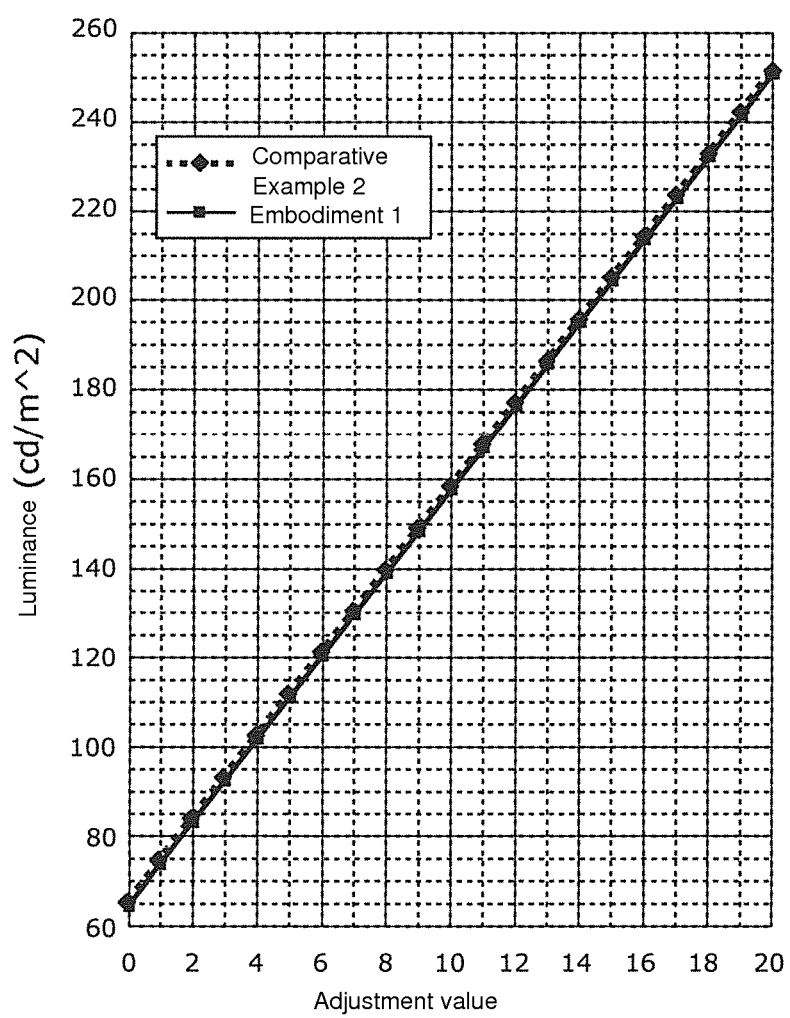
FIG. 10 is a graph showing light emission luminance with respect to the adjustment values presented in FIG. 9.

Next, the light emission characteristics of the backlight panel 210 to which the backlight drive circuit 100 according to Preferred Embodiment 1 of the present invention is connected will be described using FIGS. 9 to 11.

FIG. 9 is a table presenting the lighting duty ratios, drive currents, and light emission luminance of the backlight panel 210 when the adjustment value is changed. Note that this table also presents the lighting duty ratios, drive currents, and light emission luminance of the backlight panel in the liquid crystal display device according to Comparative Example 2.

As shown in the table of this figure, when the adjustment value is 10 or less, the lighting duty ratio is approximately one-half, and the drive current approximately double in the backlight panel 210 to which the backlight drive circuit 100 according to the present preferred embodiment is connected as compared to the backlight panel in the liquid crystal display device according to Comparative Example 2. As a result, the luminance of the backlight panel 210 is equivalent to the luminance of the backlight panel in the liquid crystal display device according to Comparative Example 2. FIG. 10 is a graph showing light emission luminance with respect to the adjustment values presented in FIG. 9.

Specifically, when the adjustment value is 10 or less, the backlight panel 210 to which the backlight drive circuit 100 according to the present preferred embodiment is connected lights at a luminance equivalent to that of the backlight panel in the liquid crystal display device according to Comparative Example 2 at a smaller lighting duty ratio than the backlight panel in the liquid crystal display device according to Comparative Example 2. In other words, when the adjustment value is 10 or less, the backlight panel 210 lights at a lighting duty ratio closer to the impulse response than the backlight panel in the liquid crystal display device according to Comparative Example 2.

Thus, when the adjustment value is 10 or less, the backlight panel 210 achieves a luminance equivalent to that of the backlight panel in the liquid crystal display device according to Comparative Example 2 by making the lighting duty ratio approximately half and the backlight drive current approximately double that of the backlight panel in the liquid crystal display device according to Comparative Example 2.

Figure 11A:
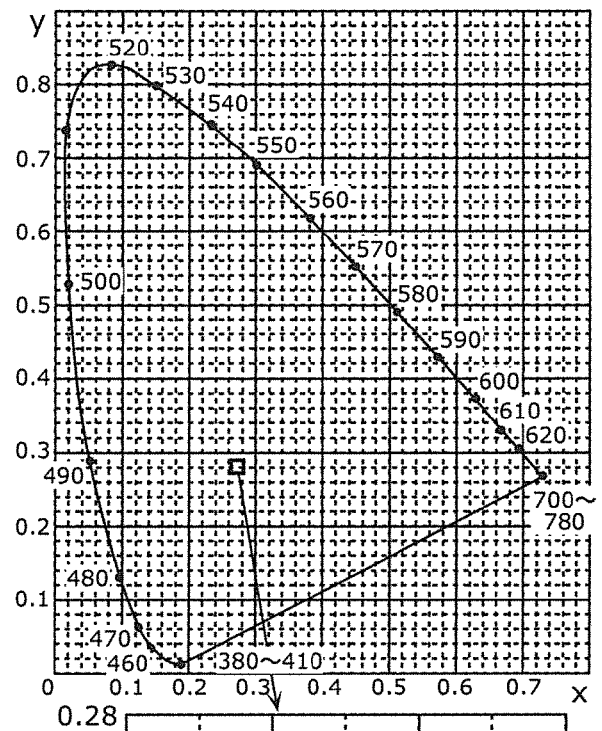
FIGS. 11A and 11B are graphs showing the chromaticity of the backlight panel when the adjustment value is changed.
Figure 11B:
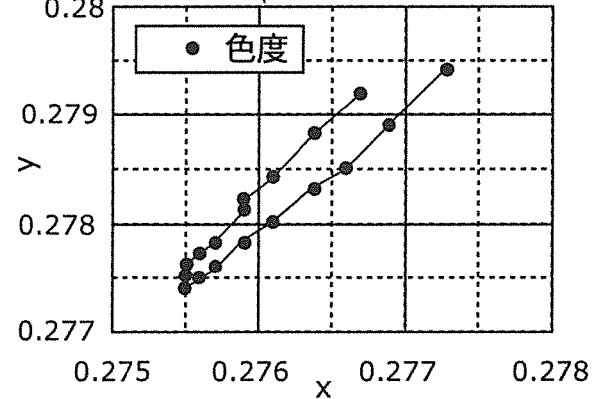

FIGS. 11A and 11B are graphs showing the chromaticity of the backlight panel 210 when the adjustment value is changed in the present preferred embodiment. FIG. 11A shows the chromaticity of the backlight panel 210 in an xy chromaticity diagram, and FIG. 11B is a partial enlargement of FIG. 11A.

As shown in these figures, the chromaticity of the backlight panel 210 is virtually identical even when the adjustment value changes. That is, there is virtually no color difference.

Thus, the backlight panel 210 to which the backlight drive circuit 100 according to Preferred Embodiment 1 of the present invention is connected achieves light emission characteristics that are equivalent to the light emission characteristics of the backlight panel in the liquid crystal display device according to Comparative Example 2. Specifically, when the adjustment value is 10 or less, the backlight panel 210 to which the backlight drive circuit 100 according to the present preferred embodiment is connected achieves light emission characteristics equivalent to those of the backlight panel in the liquid crystal display device according to Comparative Example 2 at a smaller lighting duty ratio than the backlight panel in the liquid crystal display device according to Comparative Example 2. In other words, it can light at a lighting duty ratio closer to the impulse response than the backlight panel in the liquid crystal display device according to Comparative Example 2. Consequently, motion blur is significantly reduced or prevented.

Furthermore, the backlight drive circuit 100 according to Preferred Embodiment 1 of the present invention includes the voltage switching circuit 120 (voltage generating unit) which generates a first voltage when the adjustment value is higher than the threshold value and a second voltage higher than the first voltage when the adjustment value is at or below the threshold value, as well as the backlight drivers 130 which convert the first voltage generated by the voltage switching circuit 120 to a first current and the second voltage to a second current and supply them as drive currents. As a result, current is switched between two levels with a simple constitution.

Modified Example of Preferred Embodiment 1

Next, the backlight drive circuit according to a modified example of Preferred Embodiment 1 of the present invention will be described.

In the backlight drive circuit 100 according to Preferred Embodiment 1, the SOC 111 and the TCON 112 were preferably used to generate pulse signals PWM0 to PWM2 that correspond to the respective backlight drivers 130a to 130c, but an SOC may be used to build the pulse signals PWM0 to PWM2 without using the TCON 112.

Figure 12:
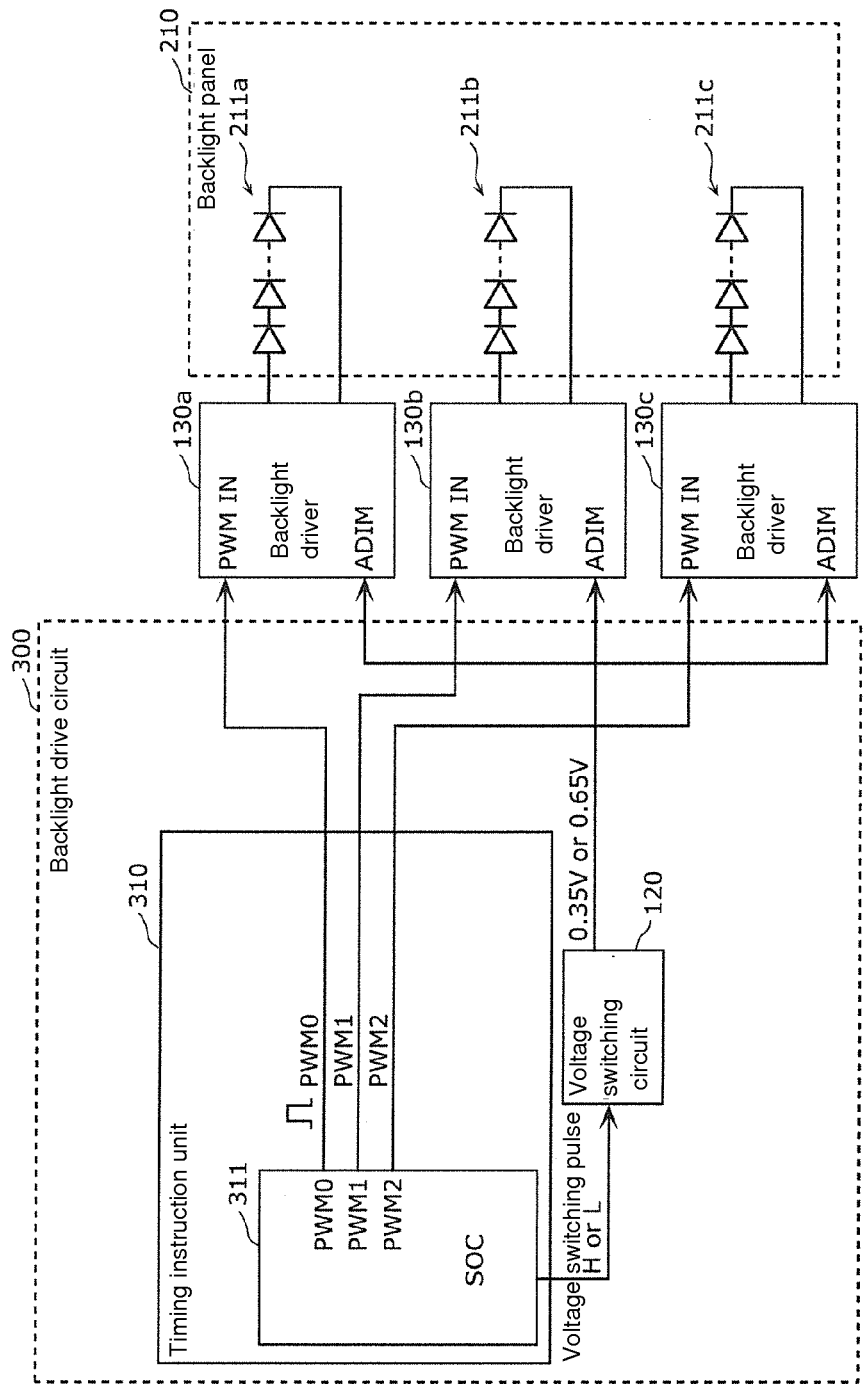
FIG. 12 is a block diagram showing the detailed constitution of the backlight drive circuit according to a modified example of Preferred Embodiment 1 of the present invention.

FIG. 12 is a block diagram showing the detailed constitution of the backlight drive circuit 300 according to a modified example of Preferred Embodiment 1.

The backlight drive circuit 300 shown in this figure is nearly the same as the backlight drive circuit 100 according to Preferred Embodiment 1, but the difference is that instead of the timing instruction unit 110, a timing instruction unit 310 composed of an SOC 311 is provided.

The SOC 311 has the functions of the SOC 111 and the TCON 112. The SOC 311 generates three pulse signals PWM0 to PWM2 which are synced to vertical sync signals based on a signal that indicates the adjustment value that was input. Moreover, the SOC 311 generates a voltage switching pulse that is H when the adjustment value which indicates the luminance of the backlight panel 210 is higher than a threshold value (e.g., 10) and L when the adjustment value is at or below the threshold value, and outputs it to the voltage switching circuit 120.

The same effects as in Preferred Embodiment 1 is also exhibited in the backlight drive circuit 300 according to such a modified example of Preferred Embodiment 1. Thus, motion blur and double-imaging are significantly reduced or prevented more than in the liquid crystal display device according to Comparative Example 2 even when the adjustment value is high.

Preferred Embodiment 2

Next, Preferred Embodiment 2 of the present invention will be described. The backlight drive circuit according to the present preferred embodiment is almost the same as the backlight drive circuit 100 according to Preferred Embodiment 1; the difference is that as the adjustment value becomes smaller, the drive current is increased steplessly. As a result, the backlight drive circuit according to the present preferred embodiment achieves effects similar to the backlight drive circuit 100 according to Preferred Embodiment 1 while also significantly reducing or preventing flicker.

The backlight drive circuit according to Preferred Embodiment 2 of the present invention will be described below, focusing on differences from the backlight drive circuit 100 according to Preferred Embodiment 1.

Figure 13:
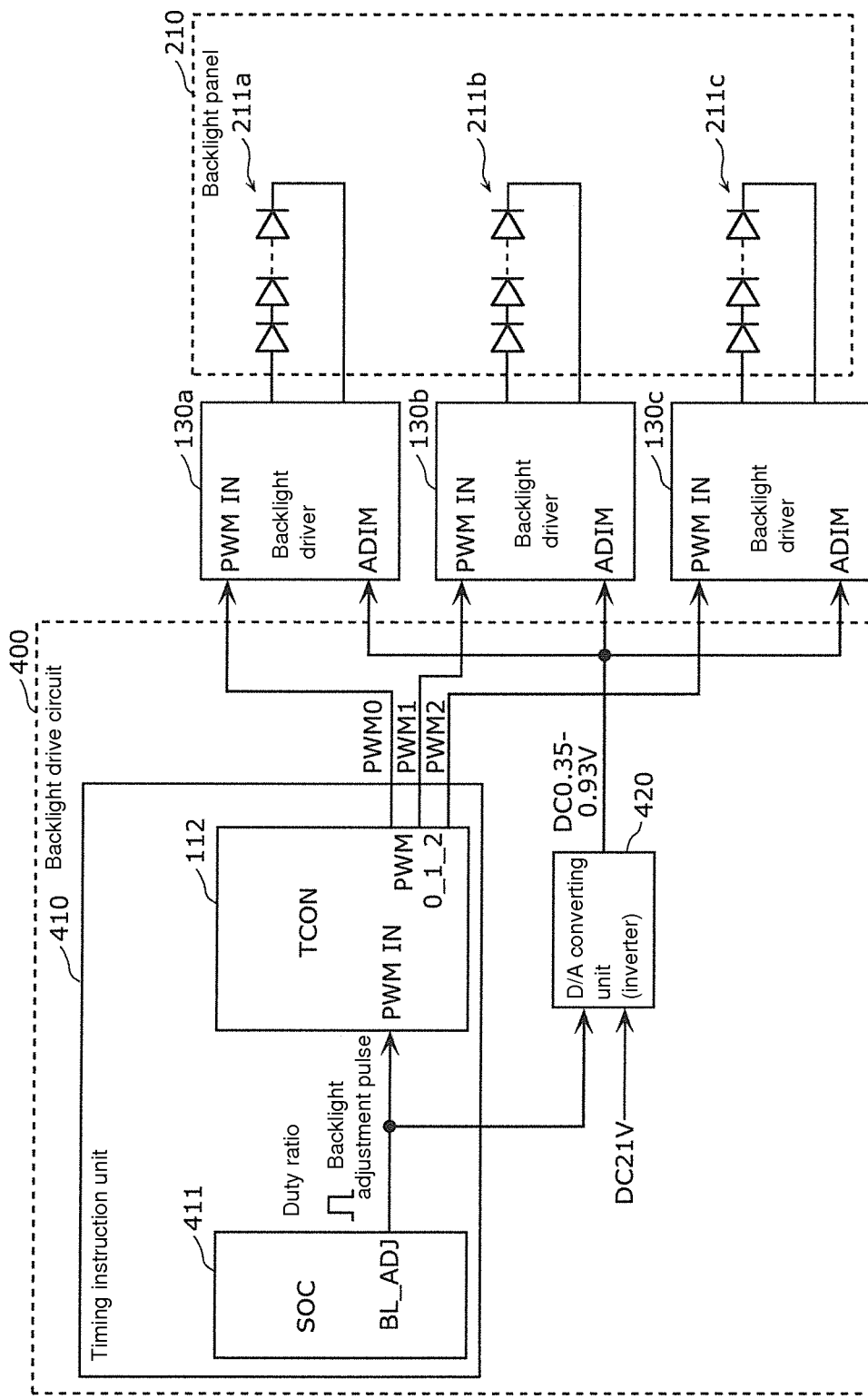
FIG. 13 is a block diagram showing the detailed constitution of the backlight drive circuit according to Preferred Embodiment 2 of the present invention.

FIG. 13 is a block diagram showing the detailed constitution of the backlight drive circuit 400 according to Preferred Embodiment 2 of the present invention.

The backlight drive circuit 400 in this figure differs from the backlight drive circuit 100 shown in FIG. 2 in that it is provided with a timing instruction unit 410 instead of the timing instruction unit 110 and a D/A converting unit 420 instead of the voltage switching circuit 120. Note that this figure also shows the backlight panel 210 to which drive current is supplied from the backlight drivers 130a to 130c.

Compared to the timing instruction unit 110 in Preferred Embodiment 1, the timing instruction unit 410 is equipped with an SOC 411 instead of the SOC 111, and the lighting and extinguishing timing of each of the backlights 211 is ordered such that the higher the adjustment value, the longer the lit period.

The SOC 411 generates the backlight adjustment pulse at a duty ratio in keeping with the adjustment value that indicates the luminance of the backlight panel 210, just as the SOC 111 does. In addition, the SOC 411 outputs this backlight adjustment pulse to the D/A converting unit 420.

Here, the SOC 411 makes the duty ratio of the backlight adjustment pulse be the normal duty ratio when the adjustment value (which indicates the luminance of the backlight panel 210) is its maximum value (e.g., 20); when the value adjustment is other than the maximum value, the duty ratio of the backlight adjustment pulse is made smaller than the normal duty ratio. Note that the "normal duty ratio" refers to the duty ratio required when a minimum current described below is supplied to a backlight 211, thus obtaining the luminance of the backlight 211 that corresponds to this adjustment value.

The D/A converting unit 420 is merely one example of the voltage generating unit according to a preferred embodiment of the present invention; the lower the adjustment value is, the higher the voltage that it generates. The higher the duty ratio of the backlight adjustment pulse that is output from the SOC 411, the lower the voltage that it generates, and the lower the duty ratio of the backlight adjustment pulse, the higher the voltage that it generates. The maximum voltage generated by this D/A converting unit preferably is about 0.95 V, for example, and the minimum voltage preferably is about 0.35 V, for example.

To elaborate this, the D/A converting unit 420 includes a D/A converter which performs D/A (digital/analog) conversion of the duty ratio of the backlight adjustment pulse that is input from the SOC 411 and thus generates an analog voltage that is lower as the duty ratio of the backlight adjustment pulse is smaller, and an inverter circuit which inverts the voltage level of the analog voltage generated by the D/A converter and thus generates a higher voltage as the duty ratio of the backlight adjustment pulse is smaller.

Accordingly, the drive current that the backlight drivers 130a to 130c supply to the backlights 211a to 211c that correspond to the H periods of the corresponding pulse signals PWM0 to PWM2 switches steplessly according to the adjustment value. The higher the adjustment value, the greater the current supplied, and the lower the adjustment value, the smaller the current supplied. For example, in cases where the adjustment value changes in increments of 1 between 0 and 20, the minimum current (e.g., about 350 mA) is supplied when the adjustment value is the maximum value of 20, while the maximum current (e.g., about 930 mA) is supplied when the adjustment value is the minimum value of 0.

As a result, the backlights 211a to 211c emit light using smaller current in the H periods of the pulse signals PWM0 to PWM2 the higher that the adjustment value is and emit light using larger current in the H periods of the pulse signals PWM0 to PWM2 the lower that the adjustment value is.

Consequently, the liquid crystal display device in which the backlight drive circuit 400 according to the present preferred embodiment is mounted achieves luminance of the backlight panel 210 equivalent to that of the liquid crystal display devices according to Comparative Examples 1 and 2 even when the adjustment value is other than the maximum value, and the H periods of the pulse signals PWM0 to PWM2 are shorter than the duty ratios of the liquid crystal display devices according to Comparative Examples 1 and 2. When the adjustment value is other than the maximum value, the lighting of the backlights 211a to 211c is brought close to the impulse response. Therefore, motion blur is ameliorated.

Furthermore, with the backlight drive circuit 100 according to Preferred Embodiment 1, the first current is supplied when the adjustment value is higher than the threshold value, and the second current is supplied when the adjustment value is at or below the threshold value, so when the adjustment value has changed and exceeds the threshold value, there is the risk of the current supplied to the backlights 211 switching considerably, resulting in flicker.

In contrast, with the backlight drive circuit 400 according to the present preferred embodiment, the current supplied to the backlights 211a to 211c switches steplessly according to the adjustment value such that the higher the adjustment value, the larger the current supplied, and the lower the adjustment value, the smaller the current supplied. Consequently, even when the adjustment value changes, the current supplied to the backlights 211 is rarely subjected to large changes.

Accordingly, the backlight drive circuit 400 according to the present preferred embodiment significantly reduces or prevents flicker compared to the backlight drive circuit 100 according to Preferred embodiment 1.

Figure 14:
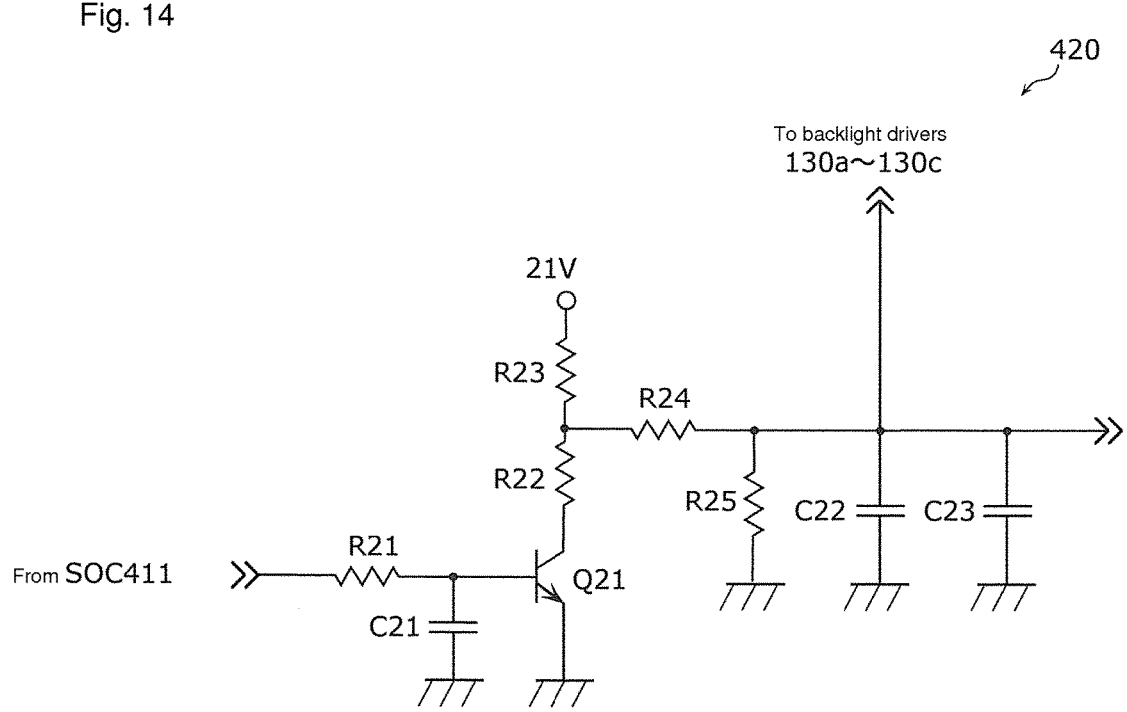
FIG. 14 is a circuit diagram showing one example of the detailed constitution of the D/A converting unit.

Next, the detailed constitution of the D/A converting unit 420 in the present preferred embodiment will be described. FIG. 14 is a circuit diagram showing one example of the detailed constitution of the D/A converting unit 420.

The D/A converting unit 420 includes resistors R21 to R25, capacitors C21 to C23, and a transistor Q21.

The capacitor C21 is a capacitive element that removes noise.

The transistor Q21 is grounded at its emitter, its collector is connected to each of the backlight drivers 130a to 130c via the resistors R22 and R24, and a voltage in keeping with the duty ratio of the backlight adjustment pulse that is output from the SOC 411 is input to the base via the resistor R21. Accordingly, the higher the voltage input to the base, the more the current flowing between the collector and emitter of the transistor Q21 increases, and the more the voltage at the contact points of the resistors R22, R23, and R24 declines. Therefore, the voltage supplied to the backlight drivers 130a to 130c declines. On the other hand, the lower the voltage input to the base, the more the current flowing between the collector and emitter of the transistor Q21 decreases, and the more the voltage at the contact points of the resistors R22, R23, and R24 rises. Therefore, the voltage supplied to the backlight drivers 130a to 130c rises. That is to say, the transistor Q21 is an inverter circuit which inverts voltage.

Moreover, the transistor Q21, the resistors R22 to R25, and the capacitors C22 and C23 constitute an RC integrator circuit. This RC integrator circuit passes through frequency components at or below a frequency in keeping with a time constant determined by the transistor Q21, the resistors R22 to R25, and the capacitors C22 and C23. That is, this RC integrator circuit is a low-pass filter.

Here, the backlight adjustment pulse that is output from the SOC 411 is a pulse whose duty ratio is higher as the adjustment value of the backlight panel is higher, so the pulse that is output from the inverter circuit is a pulse whose duty ratio is lower as the adjustment value of the backlight panel is higher. For this reason, the higher the duty ratio, the lower the voltage of the signal that has passed through the RC integrator circuit is. The higher the adjustment value of the backlight panel, the lower the voltage is.

More specifically, the higher the adjustment value of the backlight panel, and the higher the duty ratio of the voltage that is input to the base of the transistor Q21, the higher the duty ratio of the current flowing between the collector and emitter of the transistor Q21 gets, and the lower the duty ratio of the voltage at the contact points of the resistors R22 to R24 gets. Therefore, the higher the duty ratio of the voltage that is input to the base of the transistor Q21 (the higher the adjustment value of the backlight panel), the lower the duty ratio of the voltage supplied to the backlight drivers 130a to 130c gets.

Meanwhile, the pulse that is output from the inverter circuit is a pulse whose duty ratio is higher as the adjustment value of the backlight panel is lower. For this reason, the lower the duty ratio, the higher the voltage of the signal that has passed through the RC integrator circuit. The lower the adjustment value of the backlight panel, the higher the voltage is.

More specifically, the lower the adjustment value of the backlight panel, and the lower the duty ratio of the voltage that is input to the base of the transistor Q21, the lower the duty ratio of the current flowing between the collector and emitter of the transistor Q21 gets, and the higher the duty ratio of the voltage at the contact points of the resistors R22 to R24 gets. Therefore, the lower the duty ratio of the voltage that is input to the base of the transistor Q21 (the lower the adjustment value of the backlight panel), the higher the duty ratio of the voltage supplied to the backlight drivers 130a to 130c gets.

Accordingly, the higher the duty ratio of the backlight adjustment pulse, the lower the voltage that the D/A converting unit 420 outputs, while the lower the duty ratio of the backlight adjustment pulse, the higher the voltage that it outputs. That is, the higher the adjustment value, the lower the voltage generated; the lower the adjustment value, the higher the voltage generated.

As was described above, in the backlight drive circuit 400 according to the present preferred embodiment, the higher the adjustment value, the smaller the drive current during the period when each of the backlights 211 is caused to light; the lower the adjustment value is, the larger the current is. In addition, the lighting duty ratio is the normal duty ratio when the adjustment value is its maximum value; when the adjustment value is not the maximum value, the ratio is made smaller than the normal duty ratio. The drive current during the lit periods of the backlights 211 and the lighting duty ratios of the backlights 211 will be described below using FIGS. 15 and 16.

Figure 15:
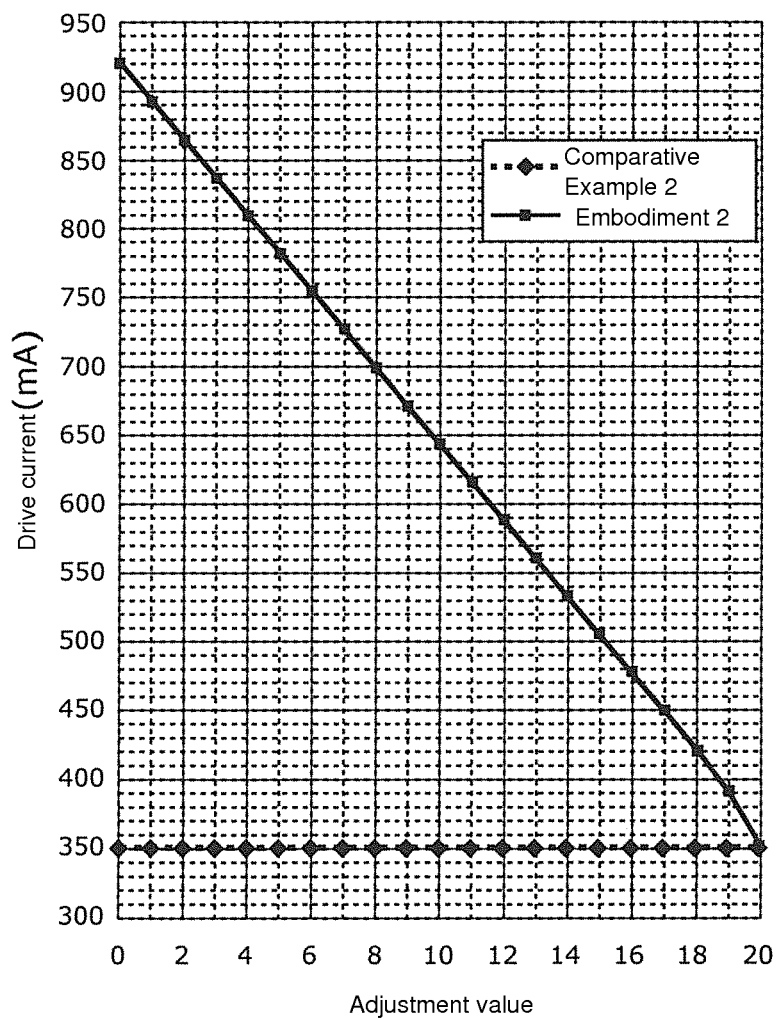
FIG. 15 is a graph showing drive current during the lit periods of the backlights with respect to the adjustment value.

FIG. 15 is a graph showing drive current during the lit periods of the backlights 211 with respect to the adjustment values. Note that this figure shows the drive current supplied to the backlights 211 in Preferred Embodiment 2 and the drive current supplied to the backlights in Comparative Example 2 described above.

As shown in this figure, in Comparative Example 2, the drive current supplied to the backlights is always a constant current of about 350 mA regardless of the adjustment value. By contrast, the backlight drive circuit 400 according to the present preferred embodiment supplies about 350 mA to the backlights 211 just as in Comparative Example 2 when the adjustment value is the maximum value of 20; the lower the adjustment value, the larger the current supplied. The minimum current (e.g., about 350 mA) is supplied when the adjustment value is the maximum value of 20, and the maximum current (e.g., about 930 mA) is supplied when the adjustment value is the minimum value of 0.

The current value of the drive current may be determined as follows: when the backlights 211 are constituted from LEDs, the rated current that can be sent to the backlights 211 differs according to the lighting duty ratios; the lower the lighting duty ratio, the higher the rated current. Therefore, the rated current that corresponds to the minimum lighting duty ratio, which is among the combinations of lighting duty ratio and rated current that can realize the luminance corresponding to the adjustment value, may serve as the current value for drive current.

Thus, with the backlight drive circuit 400 according to Preferred Embodiment 2, the drive current supplied to the backlights 211 switches steplessly according to the adjustment value. The backlight drive circuit 400 according to the present preferred embodiment thus significantly reduces or prevents flicker.

With the backlight drive circuit 100 according to Preferred Embodiment 1, the drive current supplied to the backlights 211 changes from about 650 mA to about 350 mA when the adjustment value switches from 10 to 11 as shown in FIG. 5. The amount of change of this current is about 300 mA, which may cause flicker when the adjustment value switches.

In contrast to this, with the backlight drive circuit 400 according to Preferred Embodiment 2, the drive current supplied to the backlights 211 changes from approximately 640 mA to approximately 610 mA when the adjustment value switches from 10 to 11. The amount of change of this current is about 30 mA, which is small enough compared to the amount of current change in the backlight drive circuit 100 according to Preferred Embodiment 1. Therefore, the backlight drive circuit 400 according to Preferred Embodiment 2 significantly reduces or prevents flicker that occurs when the adjustment value switches.

Figure 16:
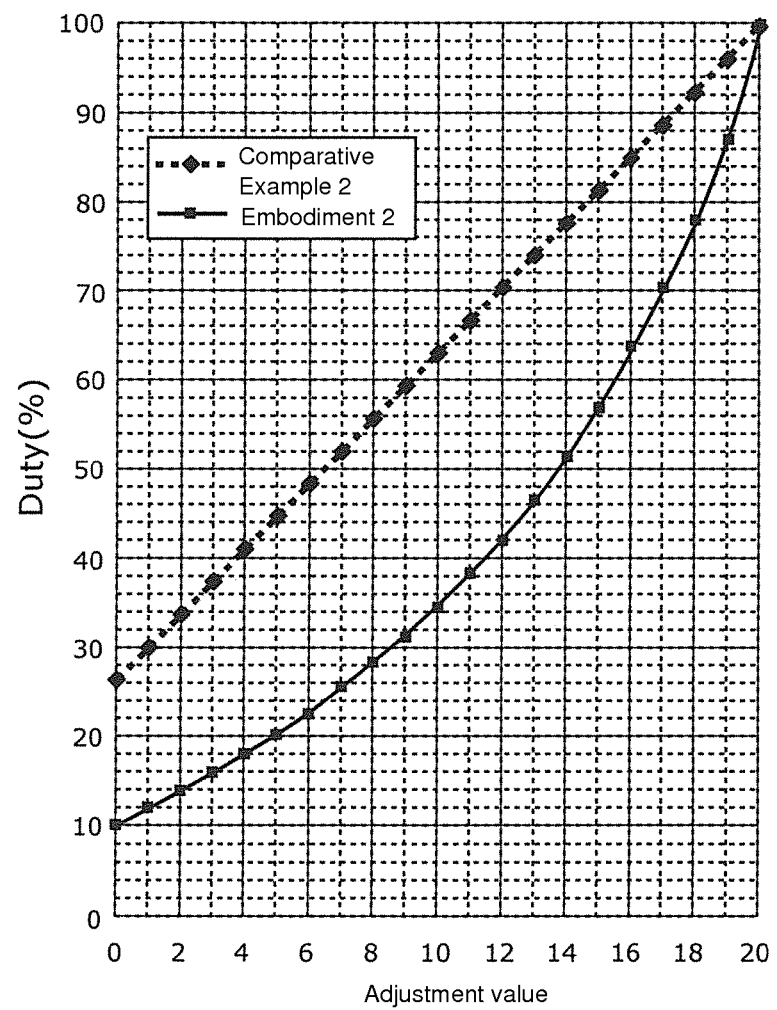
FIG. 16 is a graph showing the lighting duty ratios of the backlights with respect to the adjustment values.

FIG. 16 is a graph showing the lighting duty ratios of the backlights 221 with respect to the adjustment values.

As shown in this figure, in Comparative Example 2, the lighting duty ratio of the backlights 211 is linear with respect to the adjustment value. By contrast, the lighting duty ratio of the backlights 211 from the backlight drive circuit 100 according to the present preferred embodiment is the same sort of duty ratio as in Comparative Example 2 when the adjustment value is the maximum value of 20. When the adjustment value is not the maximum value, however, the duty ratio is smaller than even the duty ratio of Comparative Example 2.

Therefore, a liquid crystal display device in which the backlight drive circuit 400 according to the present preferred embodiment is mounted exhibits similar effects to a liquid crystal display device in which the backlight drive circuit 100 according to Preferred Embodiment 1 is mounted. Thus, motion blur and double-imaging are significantly reduced or prevented by more than the liquid crystal display device according to Comparative Example 2 when the adjustment value is 10 or below.

In a liquid crystal display device in which the backlight drive circuit 400 according to the present preferred embodiment is mounted, the scan effect is also obtained when the adjustment value allows a backlight lighting period of about ⅓ Vs, i.e., a backlight lighting duty ratio of about 33% or less.

Here, FIG. 16 will be used to confirm the adjustment values that are able to make the lighting duty ratios of the backlights about 33% or less.

With the liquid crystal display device according to Comparative Example 2, as shown in FIG. 16, the only adjustment values that can result in a backlight lighting duty ratio at or below about 33% are 0, 1, and 2. At other adjustment values (adjustment values of 3 or higher), the backlight lighting duty ratio will be higher than about 33%, making it difficult to obtain a scan effect. The scan effect can be obtained with the liquid crystal display device according to Comparative Example 2 only in the region in which the adjustment value is 0, 1, or 2.

On the other hand, with a liquid crystal display device in which the backlight drive circuit 400 according to the present preferred embodiment is mounted, the adjustment values that are able to make the lighting duty ratios of the backlights about 33% or less are 0 to 10. That is, a scan effect is obtained in the region in which the adjustment value is 10 or below, just as with the liquid crystal display device 200 in Preferred Embodiment 1. Therefore, the scan effect is obtained even in regions in which the adjustment value is large compared to the liquid crystal display device according to Comparative Example 2. The scan effect is obtained even when the backlights 211 emit light at higher luminance than the liquid crystal display device according to Comparative Example 2.

Thus, the backlight drive circuit 400 according to Preferred Embodiment 2 of the present invention makes the drive current supplied to the backlights 211 when the adjustment value is the maximum value be the normal current, and the lower the adjustment value, the more it lowers the drive current it supplies to the backlights 211. Furthermore, the lighting duty ratio of the backlights 211 is the normal duty ratio when the adjustment value is its maximum value; when the adjustment value is other than the maximum value, the ratio is made smaller than the normal duty ratio.

Moreover, with the backlight drive circuit 400 according to Preferred Embodiment 2, the drive current supplied to the backlights 211 switches steplessly according to the adjustment value. This makes it possible for the backlight drive circuit 400 according to the present preferred embodiment to significantly reduce or prevent flicker.

Figure 18:
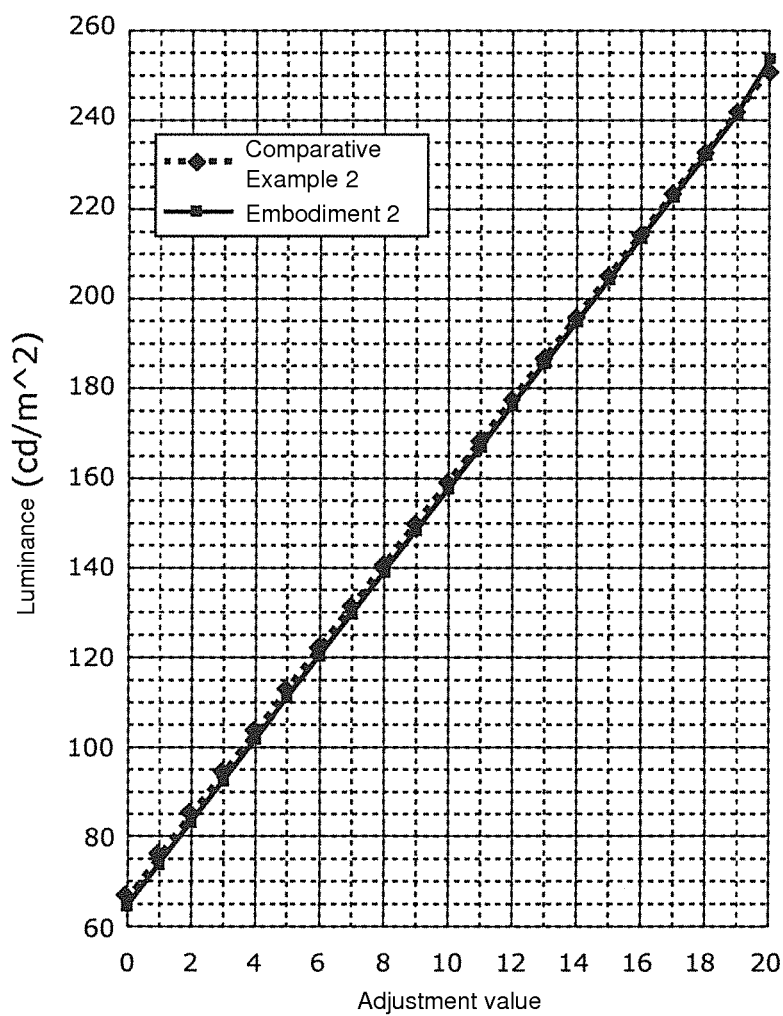
FIG. 18 is a graph showing light emission luminance with respect to the adjustment values presented in FIG. 17.

Next, the light emission characteristics of the backlight panel 210 to which the backlight drive circuit 400 according to Preferred Embodiment 2 of the present invention is connected will be described using FIGS. 17 to 19.

FIG. 17 is a table presenting the lighting duty ratios, drive currents, and light emission luminance of the backlight panel 210 when the adjustment value is changed. Note that this table also presents the lighting duty ratios, drive currents, and light emission luminance of the backlight panel in the liquid crystal display device according to Comparative Example 2.

As shown in the table in this figure, when the adjustment value is the maximum value, the lighting duty ratio is identical, and the drive current is nearly identical in the backlight panel 210 to which the backlight drive circuit 400 according to the present preferred embodiment is connected as compared to the backlight panel in the liquid crystal display device according to Comparative Example 2. Meanwhile, at adjustment values other than the maximum value, the lighting duty ratio is smaller, and the lower the adjustment value, the higher the drive current. As a result, the luminance of the backlight panel 210 is equivalent to the luminance of the backlight panel in the liquid crystal display device according to Comparative Example 2. FIG. 18 is a graph showing light emission luminance with respect to the adjustment values presented in FIG. 17.

At adjustment values other than the maximum value, the backlight panel 210 to which the backlight drive circuit 400 according to the present preferred embodiment is connected is lit at a luminance equivalent to that of the backlight panel in the liquid crystal display device according to Comparative Example 2 at a smaller lighting duty ratio than the backlight panel in the liquid crystal display device according to Comparative Example 2. To put it another way, at adjustment values other than the maximum value, the backlight panel 210 is lit at a lighting duty ratio closer to the impulse response than the backlight panel in the liquid crystal display device according to Comparative Example 2.

Thus, by making the lighting duty ratio smaller and increasing the drive current of the backlights compared to the backlight panel in the liquid crystal display device according to Comparative Example 2 when the adjustment value is other than the maximum value, the backlight panel 210 to which the backlight drive circuit 400 according to the present preferred embodiment is connected achieves luminance equivalent to that of the backlight panel in the liquid crystal display device according to Comparative Example 2.

Figure 19A:
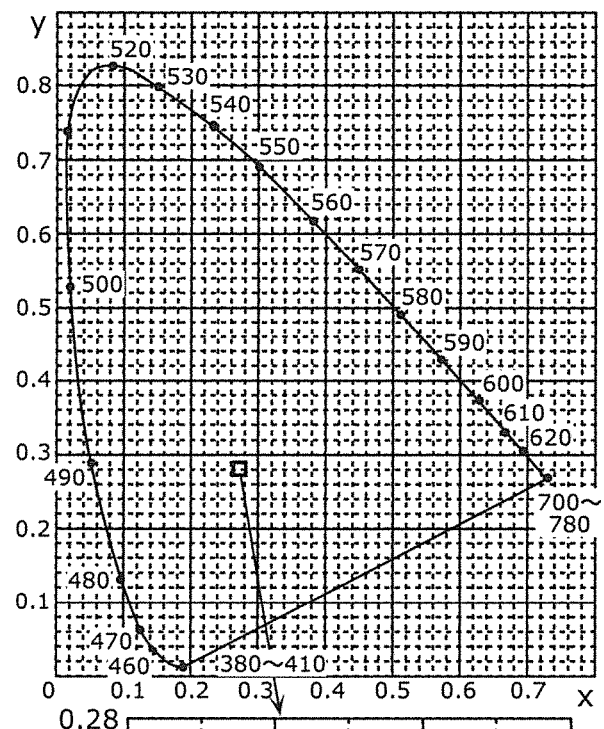
FIGS. 19A and 19B are graphs showing the chromaticity of the backlight panel when the adjustment value is changed.
Figure 19B:
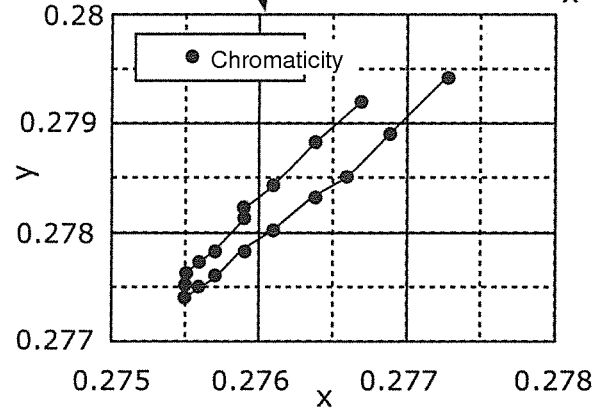

FIGS. 19A and 19B are graphs showing the chromaticity of the backlight panel 210 when the adjustment value is changed in the present preferred embodiment, wherein FIG. 19A shows the chromaticity of the backlight panel 210 in an xy chromaticity diagram, and FIG. 19B is a partial enlargement of FIG. 19A.

As shown in these figures, the chromaticity of the backlight panel 210 is virtually identical even when the adjustment value changes. That is, there is virtually no color difference.

Thus, the backlight panel 210 to which the backlight drive circuit 400 according to Preferred Embodiment 2 of the present invention is connected achieves light emission characteristics that are equivalent to the light emission characteristics of the backlight panel in the liquid crystal display device according to Comparative Example 2. That is, at adjustment values other than the maximum value, the backlight panel 210 to which the backlight drive circuit 400 according to the present preferred embodiment is connected achieves light emission characteristics that are equivalent to those of the backlight panel in the liquid crystal display device according to Comparative Example 2 at a smaller lighting duty ratio than the backlight panel in the liquid crystal display device according to Comparative Example 2. In other words, it can light at a lighting duty ratio closer to the impulse response than the backlight panel in the liquid crystal display device according to Comparative Example 2. As a result, the backlight drive circuit 400 according to the present preferred embodiment significantly reduces or prevents motion blur in the same manner as the backlight drive circuit 100 according to Preferred Embodiment 1.

In addition, with the backlight drive circuit 400 according to Preferred Embodiment 2, the drive current supplied to the backlights 211 switches steplessly according to the adjustment value. Consequently, compared to the backlight drive circuit 100 according to Preferred Embodiment 1, the backlight drive circuit 400 according to the present preferred embodiment also significantly reduces or prevents flicker.

Furthermore, the backlight drive circuit 400 according to Preferred Embodiment 2 of the present invention includes the D/A converting unit 420 (voltage generating unit) which generates a voltage that is higher as the adjustment value becomes lower and the backlight drivers 130 which convert the voltage generated by the D/A converting unit 420 to a current and supply it as the drive current. As a result, current is steplessly adjusted with a simple constitution.

Modified Example of Preferred Embodiment 2

Next, the backlight drive circuit according to a modified example of Preferred Embodiment 2 of the present invention will be described.

In the backlight drive circuit 400 according to Preferred Embodiment 2, the SOC 411 and the TCON 112 were preferably used to generate pulse signals PWM0 to PWM2 that correspond to the respective backlight drivers 130a to 130c, but an SOC may be used to build the pulse signals PWM0 to PWM2 without using the TCON 112.

Figure 20:
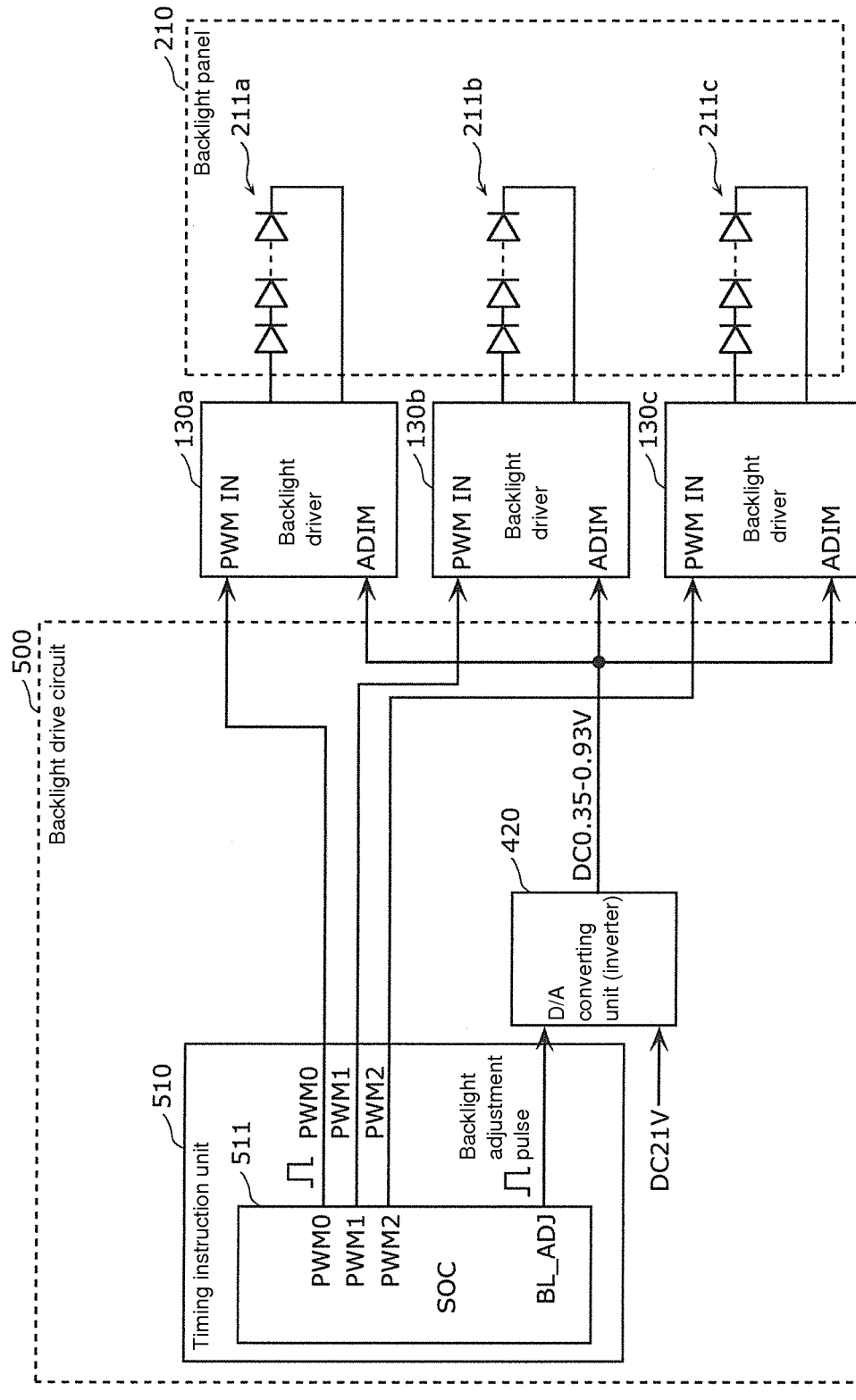
FIG. 20 is a block diagram showing the detailed constitution of the backlight drive circuit according to a modified example of Preferred Embodiment 2 of the present invention.

FIG. 20 is a block diagram showing the detailed constitution of the backlight drive circuit 500 according to a modified example of Preferred Embodiment 2.

The backlight drive circuit 500 shown in this figure is nearly the same as the backlight drive circuit 400 according to Preferred Embodiment 2, but the difference is that instead of the timing instruction unit 410, a timing instruction unit 510 composed of an SOC 511 is provided.

The SOC 511 has the functions of the SOC 411 and the TCON 112. The SOC 511 generates three pulse signals PWM0 to PWM2 that are synched to vertical sync signals based on a signal that indicates the adjustment value that was input. It also generates backlight adjustment pulses of duty ratios in keeping with the adjustment values that indicate the luminance of the backlight panel 210 and outputs them to the D/A converting unit 420.

The same effects as in Preferred Embodiment 2 are also exhibited in the backlight drive circuit 500 according to such a modified example of Preferred Embodiment 2. Namely, flicker is significantly reduced or prevented, and even when the adjustment value is high, motion blur and double-imaging are significantly reduced or prevented.

The backlight drive circuits according to the preferred embodiments of the present invention were described above, but the present invention is in no way limited to these preferred embodiments.

For instance, the adjustment value may be specified by a user operation or may be specified by an illumination sensor attached to the liquid crystal display device. Alternatively, it may be specified according to the scan signal (i.e., dynamic backlighting). Moreover, the adjustment values of the respective backlights 211a to 211c may be specified independently and may be specified independently according to the scan signal, for example.

In addition, in Preferred Embodiment 1 and its modified example described above, the voltage switching circuit 120 switched a voltage generated using a voltage switching pulse that is output from an SOC, but the constitution is not limited to this. For example, the voltage switching circuit 120 may be constituted so as to have an integrator circuit and a comparator and to be provided with a backlight adjustment pulse as input from the SOC 111.

Furthermore, the transistors Q11 and Q21 were described in terms of bipolar transistors in the preferred embodiments, but they may also be metal-oxide-semiconductor (MOS) transistors. Moreover, in the preferred embodiments, the transistors Q11 and Q21 were described in terms of n-type transistors, but they may also be p-type transistors, in which case the equivalent function may be realized by changing the connections of peripheral circuit elements, power supplies, and the like.

In addition, in the preferred embodiments, the backlight panel 210 was described in terms of a three-stage constitution for backlights 211; however, it is sufficient as long as the backlights have n stages (where n≥2), in which case a scan effect is obtained if the adjustment value allows a lighting duty ratio of $((n-1)/n)-Trs$ or less, where Trs is the response speed of the liquid crystal pixels 221. Furthermore, the timing of extinguishing the backlight 211 which lights $m^{th}$ (1≤m≤n) in a single display period may be to extinguish $((m-1)/n) \times Td$ after the start of the display period, where Td is a single display period.

Moreover, all or part of the constituent elements that constitute the backlight drive circuits may be constituted as a single system large scale integration (LSI), for example. A system LSI is an ultra-multifunction LSI fabricated by integrating a plurality of constituent parts on a single chip; it is a computer system that is constituted including a microprocessor, ROM, RAM, and the like. Computer programming is stored in the RAM. The system LSI achieves its functions by the microprocessor operating according to computer programming.

In addition, the circuit constitutions shown in the circuit diagrams described above are merely examples, and the present invention is not limited to the circuit constitutions. Circuits that can implement the characteristic functions of the present invention in the same way as the circuit configurations are also included in the present invention. For example, the present invention also include circuit configurations that connect elements such as transistors, resistive elements, and capacitive elements in series or in parallel to a given element within the scope that can implement functions similar to those of the circuit configurations. In other words, "connected" in the preferred embodiments is not limited to the case of direct connection of two terminals (nodes), but also includes cases of connection of these two terminals (nodes) via elements within the scope that can implement the same sorts of function.

Furthermore, it is also possible to combine each of the preferred embodiments and the modified examples.

Preferred embodiments of the present invention can be applied to display devices which display video images, such as televisions, smartphones, and tablet terminals.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A display device comprising:
a display;
a plurality of light sources; and
a light source drive circuit;
wherein the light source drive circuit outputs a drive signal to the light sources; and for at least one light source of the plurality of light sources and in a plurality of consecutive frames;

a rate of change in a duty ratio of the drive signal with respect to a luminance of the at least one light source that is lower than a given luminance is less than a rate of change in the duty ratio of the drive signal with respect to a luminance of the at least one light source that is higher than the given luminance, and an amplitude of the drive signal with respect to the luminance of the at least one light source that is lower than the given luminance is greater than the amplitude of the drive signal with respect to the luminance of the at least one light source that is higher than the given luminance.

2. The display device according to claim 1, further comprising:

a timing instruction unit which orders lighting and extinguishing timing of the at least one light source to achieve a relationship of the higher an adjustment value, the longer a period;

a voltage generating unit which generates a first voltage when the adjustment value is above a threshold value and generates a second voltage that is higher than the first voltage when the adjustment value is at or below the threshold value; wherein the light source drive circuit converts the first voltage generated by the voltage generating unit into the first current, converts the second voltage into the second current, and supplies the converted currents as the drive current during a period during which the at least one light source is ordered to be lit by the timing instruction unit.

3. The display device according to claim 2, wherein the timing instruction unit generates a voltage switching signal that indicates whether or not the adjustment value is higher than the threshold value; and the voltage generating unit generates the first voltage when the voltage switching signal generated by the timing instruction unit indicates that the adjustment value is higher than the threshold value and generates the second voltage when the signal indicates that the adjustment value is at or below the threshold value.

4. The display device according to claim 1, wherein the current value of each of the drive currents during a lit period is higher as the adjustment value is lower.

5. The display device according to claim 4, further comprising:

a timing instruction unit which orders lighting and extinguishing timing of the at least one light source to achieve a relationship of the higher the adjustment value, the longer the lit period;

a voltage generating unit which generates a voltage that is higher the lower the adjustment value is; wherein the light source drive circuit converts the voltage generated by the voltage generating unit into a current and supplies the converted current as the drive current during a period during which the at least one light source is ordered to be lit by the timing instruction unit.

6. The display device according to claim 5, wherein the timing instruction unit generates a pulse width modulation signal which has a duty ratio that is smaller as the adjustment value is lower; and the voltage generating unit includes:

a digital/analog converter which generates an analog voltage that is lower the smaller a duty of the pulse width modulation signal is by digital/analog converting the duty ratio of the pulse width modulation signal; and an inverter circuit which generates a voltage that is higher the smaller the duty of the pulse width modulation signal is by inverting the voltage level of the analog voltage generated by the digital/analog converter.

7. The display device according to claim 6, wherein the digital/analog converter is an integrator including resistors and capacitors; and the inverter circuit includes a transistor that applies an analog voltage generated by the digital/analog converter to a control terminal of the transistor and one of two output terminals is grounded.

8. The display device according to claim 1, wherein adjustment values of the drive signal are specified by a user operation.

9. A display device comprising:
a display;
a plurality of light sources; and
a light source drive circuit outputs a drive signal to the plurality of light sources; and for at least one light source of the plurality of light sources and in a plurality of consecutive frames, a rate of change in a duty ratio of the drive signal with respect to a luminance of the at least one light source that is lower than a given luminance is less than a rate of change in the duty ratio of the drive signal with respect to a luminance of the at least one light source that is higher than the given luminance.

10. The display device according to claim 9, further comprising:

a timing instruction unit which orders lighting and extinguishing timing of the at least one light source to achieve a relationship of an adjustment value, and lit period;

a voltage generating unit which generates a first voltage when the adjustment value is above a threshold value and generates a second voltage that is higher than the first voltage when the adjustment value is at or below the threshold value; wherein the light source drive circuit converts the first voltage generated by the voltage generating unit into the first current, converts the second voltage into the second current, and supplies the converted currents as the drive current during a period during which the at least one light source is ordered to be lit by the timing instruction unit.

11. The display device according to claim 10, wherein the timing instruction unit generates a voltage switching signal that indicates whether or not the adjustment value is higher than the threshold value; and the voltage generating unit generates the first voltage when the voltage switching signal generated by the timing instruction unit indicates that the adjustment value is higher than the threshold value and generates the second voltage when the signal indicates that the adjustment value is at or below the threshold value.

12. The display device according to claim 9, wherein the current value of each of the drive currents during a lit period is higher as n adjustment value is lower.

13. The display device according to claim 12, further comprising:

a timing instruction unit which orders lighting and extinguishing timing of the at least one light source to achieve a relationship of the adjustment value, and a lit period;

a voltage generating unit which generates a voltage that is higher the lower the adjustment value is; wherein the light source drive circuit converts the voltage generated by the voltage generating unit into a current and supplies the converted current as the drive current during a period during which the at least one light source is ordered to be lit by the timing instruction unit.

14. The display device according to claim 13, wherein the timing instruction unit generates a pulse width modulation signal which has a duty ratio that is smaller as the adjustment value is lower; and the voltage generating unit includes:
   a digital/analog converter which generates an analog voltage that is lower the smaller a duty of the pulse width modulation signal is by digital/analog converting the duty ratio of the pulse width modulation signal; and
   an inverter circuit which generates a voltage that is higher the smaller the duty of the pulse width modulation signal is by inverting the voltage level of the analog voltage generated by the digital/analog converter.

15. The display device according to claim 14, wherein the digital/analog converter is an integrator including resistors and capacitors; and
   the inverter circuit includes a transistor configured to apply an analog voltage generated by the digital/analog converter to a control terminal of the transistor and one of two output terminals is grounded.

16. The display device according to claim 9, wherein adjustment values of the drive signal are specified by a user operation.

17. The display device according to claim 9, wherein a rate of change in duty ratio with respect to a luminance value in a range in which the luminance value is smaller than a specified luminance value is smaller than a rate of change in duty ratio with respect to the luminance value in a range in which the luminance value is larger than the specified luminance value.

18. A display device comprising: a display;
   a plurality of light sources including a first light source and a second light source; and
   a light source drive circuit;
   wherein the light source drive circuit outputs a drive signal to the plurality of light sources;
   in response to a luminance of the first light source being lower than a given luminance in a plurality of consecutive frames and a luminance of the second light source being higher than the given luminance in the plurality of consecutive frames, the light source drive circuit controls a rate of change in a duty ratio of the drive signal with respect to the luminance of the first light source is less than a rate of change in the duty ratio of the drive signal with respect to the luminance of the second light source.

* * * * *